(12) United States Patent
Shin

(10) Patent No.: US 11,625,456 B2
(45) Date of Patent: Apr. 11, 2023

(54) GROUP-BASED COMMUNITY SYSTEM AND METHOD FOR MANAGING THE SAME

(71) Applicant: Sang Hyun Shin, Seoul (KR)

(72) Inventor: Sang Hyun Shin, Seoul (KR)

( * ) Notice: Subject to any disclaimer, the term of this patent is extended or adjusted under 35 U.S.C. 154(b) by 162 days.

(21) Appl. No.: 17/125,269

(22) Filed: Dec. 17, 2020

(65) Prior Publication Data

US 2021/0182367 A1    Jun. 17, 2021

(30) Foreign Application Priority Data

Dec. 17, 2019 (KR) .................. 10-2019-0168847
May 4, 2020 (KR) .................. 10-2020-0053364
Aug. 3, 2020 (KR) .................. 10-2020-0096602

(51) Int. Cl.
| | | |
|---|---|---|
| *G06F 15/16* | (2006.01) | |
| *G06F 21/10* | (2013.01) | |
| *H04L 9/40* | (2022.01) | |
| *H04L 67/104* | (2022.01) | |
| *G06Q 50/00* | (2012.01) | |

(52) U.S. Cl.
CPC ............ *G06F 21/105* (2013.01); *G06Q 50/01* (2013.01); *H04L 63/108* (2013.01); *H04L 67/1044* (2013.01)

(58) Field of Classification Search
CPC ..... G06F 21/105; G06Q 50/01; H04L 63/108; H04L 63/104; H04L 67/1044
USPC .......................................................... 705/59
See application file for complete search history.

(56) References Cited

U.S. PATENT DOCUMENTS

| | | | |
|---|---|---|---|
| 2007/0192156 A1* | 8/2007 | Gauger | G06Q 10/0633 705/7.19 |
| 2008/0040386 A1* | 2/2008 | Godley | G06Q 10/10 |
| 2008/0098005 A1* | 4/2008 | Goradia | G06F 16/9535 |
| 2012/0209998 A1* | 8/2012 | Svarfvar | G06Q 30/02 709/225 |
| 2013/0151424 A1* | 6/2013 | Milone | G06Q 10/10 705/310 |
| 2013/0151970 A1* | 6/2013 | Achour | G06Q 10/101 715/723 |
| 2014/0108333 A1* | 4/2014 | Jain | H04L 67/535 707/609 |

(Continued)

FOREIGN PATENT DOCUMENTS

| | | | | |
|---|---|---|---|---|
| JP | 2002334173 A | * | 11/2002 | G06Q 30/06 |
| JP | 2015-181017 A | | 10/2015 | |

(Continued)

OTHER PUBLICATIONS

International Search Report issued in PCT/KR2020/018355; dated Mar. 26, 2021.

*Primary Examiner* — Ruolei Zong
(74) *Attorney, Agent, or Firm* — Studebaker & Brackett PC

(57) ABSTRACT

Provided are a group-based community system and managing method thereof. The group-based system comprises a group management module for creating a group and assigning a plurality of members to the group, and a badge management module for creating a badge related to the group and awarding the badge to a first member of the plurality of members, wherein, by using the badge, a right of the first member for a predetermined function in a community platform in which at least some members of the plurality of members participate is managed.

19 Claims, 26 Drawing Sheets

(56) References Cited

U.S. PATENT DOCUMENTS

| | | | | |
|---|---|---|---|---|
| 2014/0181130 | A1* | 6/2014 | Davis | G06F 16/25 |
| | | | | 707/758 |
| 2015/0033297 | A1* | 1/2015 | Sanso | H04L 63/126 |
| | | | | 726/5 |
| 2016/0149956 | A1* | 5/2016 | Birnbaum | H04L 63/20 |
| | | | | 726/1 |
| 2016/0255086 | A1* | 9/2016 | Vajravelu | H04L 63/101 |
| | | | | 726/4 |
| 2017/0039867 | A1* | 2/2017 | Fieldman | H04N 21/2187 |
| 2019/0261042 | A1* | 8/2019 | Ramadorai | H04N 21/4622 |

FOREIGN PATENT DOCUMENTS

| | | |
|---|---|---|
| KR | 10-2012-0087242 A | 8/2012 |
| KR | 10-2012-0088262 A | 8/2012 |
| KR | 10-2013-0077433 A | 7/2013 |
| KR | 10-1554987 B1 | 10/2015 |
| KR | 10-2017-0049932 A | 5/2017 |

* cited by examiner

FIG. 5A

1 limit company name only

[limit company name only ▼]
[Company Name]

FIG. 5B

1 limit company name and department

[limit company name and department ▼]
[Company Name]
[Department]

FIG. 5C

3 limit company name and role

[limit company name and role ▼]
[Company Name]
[Role]

FIG. 5D

4 limit company name, department, and role

[limit company name and department ▼]
[Company Name]
[Department]
[Role]

GROUP-BASED COMMUNITY SYSTEM AND METHOD FOR MANAGING THE SAME

CROSS-REFERENCE TO RELATED APPLICATION

This application claims priority from Korean Patent Application Nos. 10-2019-0168847 filed on Dec. 17, 2019, 10-2020-0053364 filed on May 4, 2020, and 10-2020-0096602 filed on Aug. 3, 2020, in the Korean Intellectual Property Office, and all the benefits accruing therefrom under 35 U.S.C. 119, the contents of which in their entirety are herein incorporated by reference.

BACKGROUND

1. Technical Field

The disclosure relates to a group-based community system and a method for managing the same. More specifically, it relates to a group-based community system and a method for managing the same in which it supports various community activities and management based on a group containing a plurality of members.

2. Description of the Related Art

With the development of information and communication technology, the supply of mobile devices has spread. Hence, individual or small group-oriented communication means such as a social network service (SNS) are in the spotlight. People form their own community with acquaintances through SNS, etc., strengthen intimacy and bond, and carry out various activities and information exchanges that fit the nature of the community.

However, in conventional community systems including Facebook, Instagram, Twitter, etc., many general members (or followers) can only perform simple activities such as viewing content, such as photos, videos, and posts when a community operator (or master) uploads them, and giving feedback on their responses.

Accordingly, there is a need for a group-based community system that supports each member to perform various activities within a community platform, while at the same time appropriately managing it.

SUMMARY

Aspects of the disclosure provide a group-based community system capable of effectively managing and supporting roles and activities of each member within a community platform, and a method for managing the same.

Aspects of the disclosure also provide a group-based community system capable of motivating various activities within a community platform, and a method for managing the same.

Aspects of the disclosure also provide a group-based community system capable of transparently and effectively distributing a profit generated through content to each contributor, and a method for managing the same.

However, aspects of the disclosure are not limited to those set forth herein. The above and other aspects of the disclosure will become more apparent to one of ordinary skill in the art to which the disclosure pertains by referencing the detailed description of the disclosure given below.

According to an embodiment of the disclosure, a group-based community system comprises a group management module for creating a group and assigning a plurality of members to the group, and a badge management module for creating a badge related to the group and awarding the badge to a first member of the plurality of members, wherein, by using the badge, a right of the first member for a predetermined function in a community platform in which at least some members of the plurality of members participate is managed.

According to an embodiment of the disclosure, a method is for managing a group-based community system, the method is performed by a computing device, and comprises creating a group, allocating a plurality of members to the group, creating a badge related to the group and awarding the badge to a first member of the plurality of members, and managing, by using the badge, a right of the first member for a predetermined function in a community platform in which at least some members of the plurality of members participate.

BRIEF DESCRIPTION OF THE DRAWINGS

The above and other aspects and features of the disclosure will become more apparent by describing in detail exemplary embodiments thereof with reference to the attached drawings, in which:

FIGS. 3 to 7 are exemplary diagrams for explaining a function of a group management module 110 according to an embodiment of the disclosure;

DETAILED DESCRIPTION OF THE EMBODIMENTS

Figure 1:
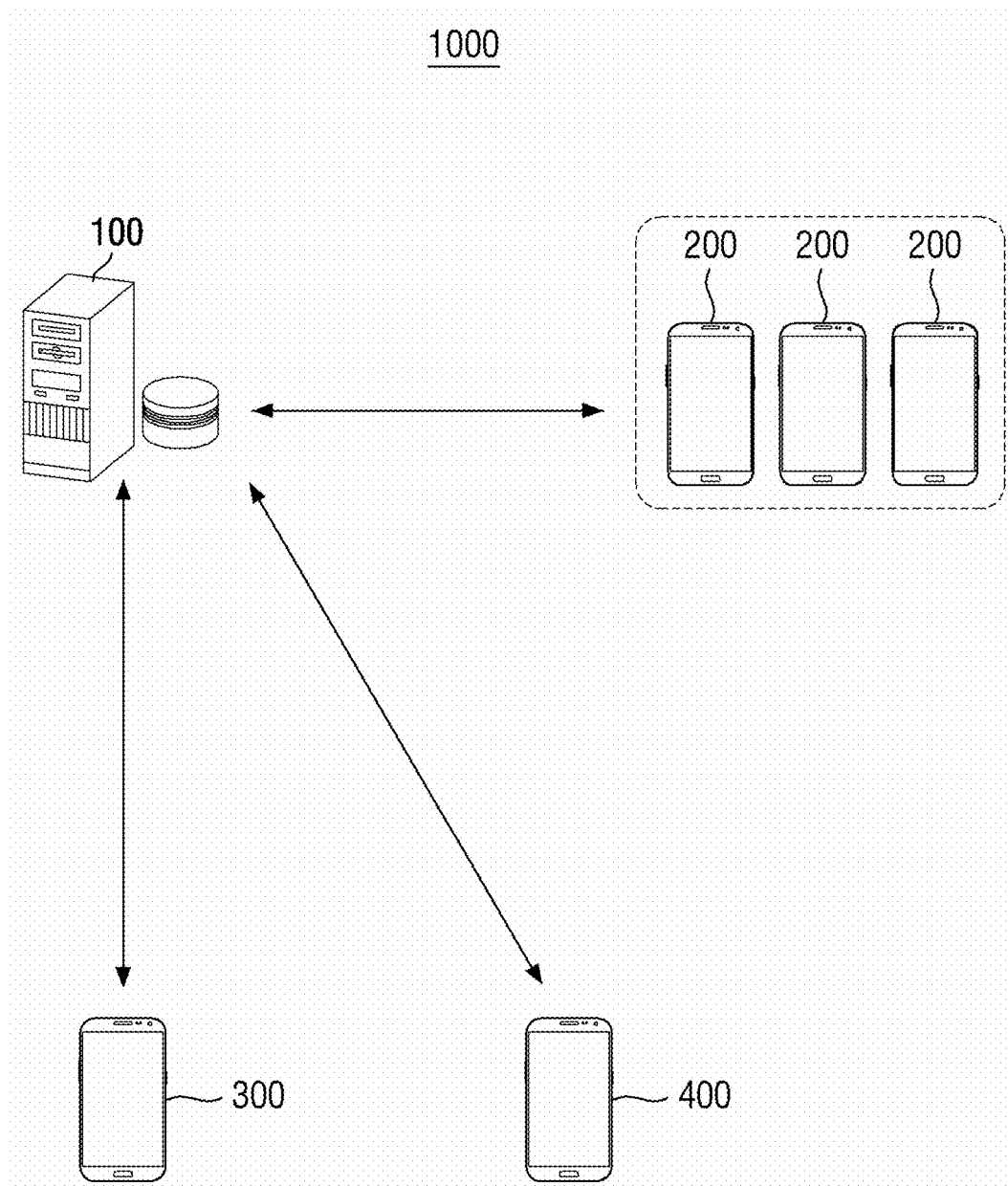
FIG. 1 is a schematic diagram illustrating an operating environment 1000 of a group-based community system according to the disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the disclosure will be described in detail with reference to the accompanying drawings.

FIG. 1 is a schematic diagram illustrating an operating environment 1000 of a group-based community system according to the disclosure. As shown in FIG. 1, the group-based community system according to the disclosure operates in an environment 1000 consisting of a server 100 and one or more user terminals 200, 300, and 400. However, this is only a preferred embodiment for achieving the object of the present disclosure. Some components may be added or deleted as necessary. Hereinafter, for the sake of brevity, a related description will be made on the assumption that the group-based community system of the disclosure is the server 100 device. However, it is not limited thereto. For example, the group-based community system of the disclosure may be implemented with the user terminals 200, 300, 400, and may be implemented as a system in which the server 100 and the user terminals 200, 300 and 400 are combined through a network.

The server 100 is a computing device that provides a group-based community management service, or a computing device that provides an application service related thereto, and may consist of one or more server devices (i.e., computing devices). Here, the computing devices may be a notebook, a desktop, a laptop, or the like, but are not limited thereto, and may include any kinds of devices equipped with a computing function and a communication function. Some examples of the computing device will be described in more detail below with reference to FIG. 26.

The user terminals 200, 300, and 400 are computing devices used by users participating in group-based community services. The user terminals 200, 300, and 400 may include a member terminal 200 participating as a member of a group-based community, a consumer terminal 300, which is not a member of the group-based community, but accesses a group-based community service and consumes related content, and a provider terminal 400, likewise, which is not a member of the group-based community, but supplies content to the group-based community service. The user terminals 200, 300, and 400 may be smart phones, smart watches, or the like. However, it is not limited thereto, and may include any device provided with computing means and communication means.

As an embodiment, an application provided by the server 100 is downloaded to the user terminals 200, 300, and 400, and a group-based community service according to the disclosure may be used through the application. Applications collectively refer to applications that may be run on smart devices such as smart phones or smart TVs.

Figure 2:
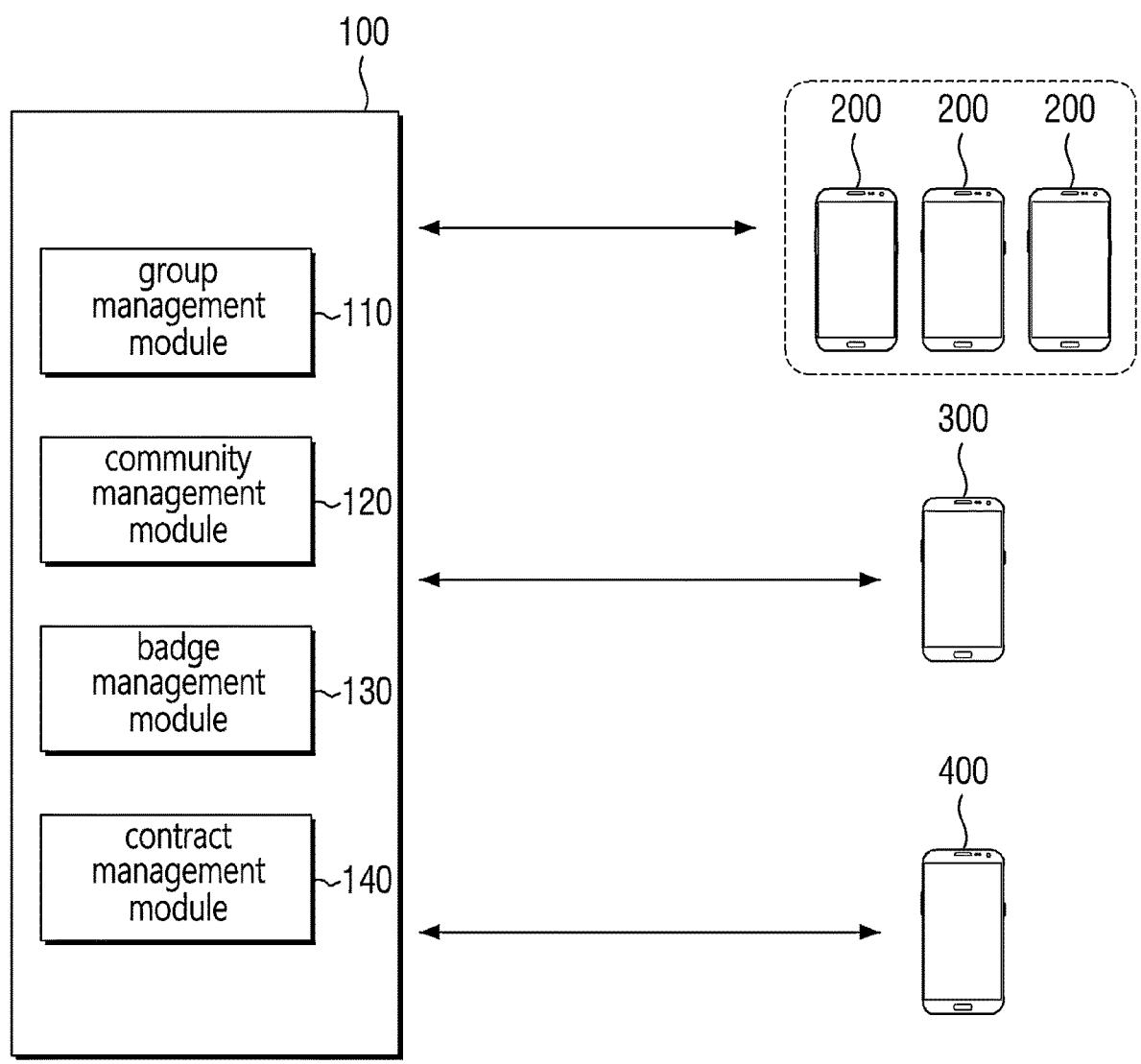
FIG. 2 is a block diagram for explaining a configuration of a group-based community system according to an embodiment of the disclosure.

FIG. 2 is a block diagram for explaining a configuration of a group-based community system according to an embodiment of the disclosure. In FIG. 2, a description will proceed assuming that each of components 110, 120, 130, and 140 of the group-based community system is implemented as the server 100 of FIG. 1. However, as mentioned above, the scope of the disclosure is not limited thereto. For example, each component 110, 120, 130, and 140 of the group-based community system may be implemented as the user terminal 200, 300, and 400. Alternatively, some of the components 110, 120, 130, and 140 may be implemented as the server 100, and the rest may be implemented as the user terminals 200, 300, and 400. Furthermore, for any of the components 110, 120, 130, and 140, the corresponding component may be implemented by combining the server 100 and the user terminals 200, 300, and 400 as a whole in a way that for some components, the server 100 shares some functions and the user terminals 200, 300, and 400 share some other functions.

Hereinafter, functions of the components 110, 120, 130, and 140 will be described with reference to the drawings.

A group management module 110 is a component that creates and manages groups for a plurality of members. Here, the group is a unit for collectively managing a plurality of members, and its name may be changed in various ways. For example, instead of the name group, one may use a generic name that means a set such as "community," "class," or "club," or a unique name that is branded independently (e.g., "CREST"). A detailed function of the group management module 110 and a method for managing a group thereby will be described later in more detail in FIGS. 3 to 7.

A community management module 120 is a module that creates and manages a community platform in which at least some of group members participate. The group-based community system of the disclosure may support various community platforms for group members. Each group member may belong to multiple community platforms in duplicate. In a specific community platform, all group members may belong together or only some of the group members may belong.

The types of community platforms provided by the community management module 120 may vary. For example, a platform for sharing video content among members, an SNS platform accessible only to members, or an address book platform providing contacts and profiles of members may be the community platform. A detailed function of the community management module 120 and a method for managing a community platform thereby will be described in more detail later in FIG. 8.

A badge management module 130 is a component that manages access rights to activities and functions of each member in the community platform. The badge management module 130 grants rights for each function in the community platform to members through a "badge."

The badge is an item for indicating or approving the rights (or access rights) of each member for a specific function. For example, an ability to upload content is only available to members who have been awarded a content upload badge. In addition, not only one function is necessarily matched to one badge, and a plurality of functions may be matched to one badge. For example, various functions such as a content upload function, a content sales function, a product sales function, or a content editing function may be simultaneously matched to the aforementioned badge. In this case, the member who has been awarded the badge will be granted the right to upload content, sell content, sell product, and edit content within the community platform at once. Detailed functions and configurations of the badge management module 130 and the badge will be described later in more detail in FIGS. 9 to 14.

Alternatively, additional incentives may be provided to members who have been awarded a badge in addition to the right to use a function. For example, in the case where a certain activity incentive is provided to members according to activities within the community platform, if the member owns a badge, a size of activity incentives offered may be greater. In other words, even if members do the same activity within the community, members who own a badge may be provided with a larger activity incentive by adding premium incentives for owning the badge.

A contract management module 140 is a component that manages the right relationship between group members for certain content. The type of rights relationship managed by the contract management module 140 may be various. For example, the contract management module 140 may manage various rights relationships, such as a relationship of ownership of group members to content, a relationship of distribution rights of group members for profits obtained based on the content, or a relationship of contribution among group members who have contributed to the production of content.

As an embodiment, the contract management module 140 may manage the rights relationship among group members by using a "seal." The seal is an item that represents the rights relationship between group members for a specific content and its contents, and performs a function of a kind of digital contract. Detailed functions and configurations of the contract management module 140 and the seal will be described later in more detail in FIGS. 17 to 24.

Hereinafter, specific embodiments of specific functions and operating methods of the group-based community system according to the disclosure will be described. To this end, in FIGS. 3 to 24, an application scenario or application screen of a group-based community service provided by the system is presented for reference. However, the application scenario or application screen at this time is adapted for convenience of description, and may be slightly different from that applied to an actual service. It will be described below with reference to the drawings.

FIGS. 3 to 7 are exemplary diagrams for explaining a function of a group management module 110 according to an embodiment of the disclosure. First, a description will be given with reference to FIG. 3.

Figure 3:
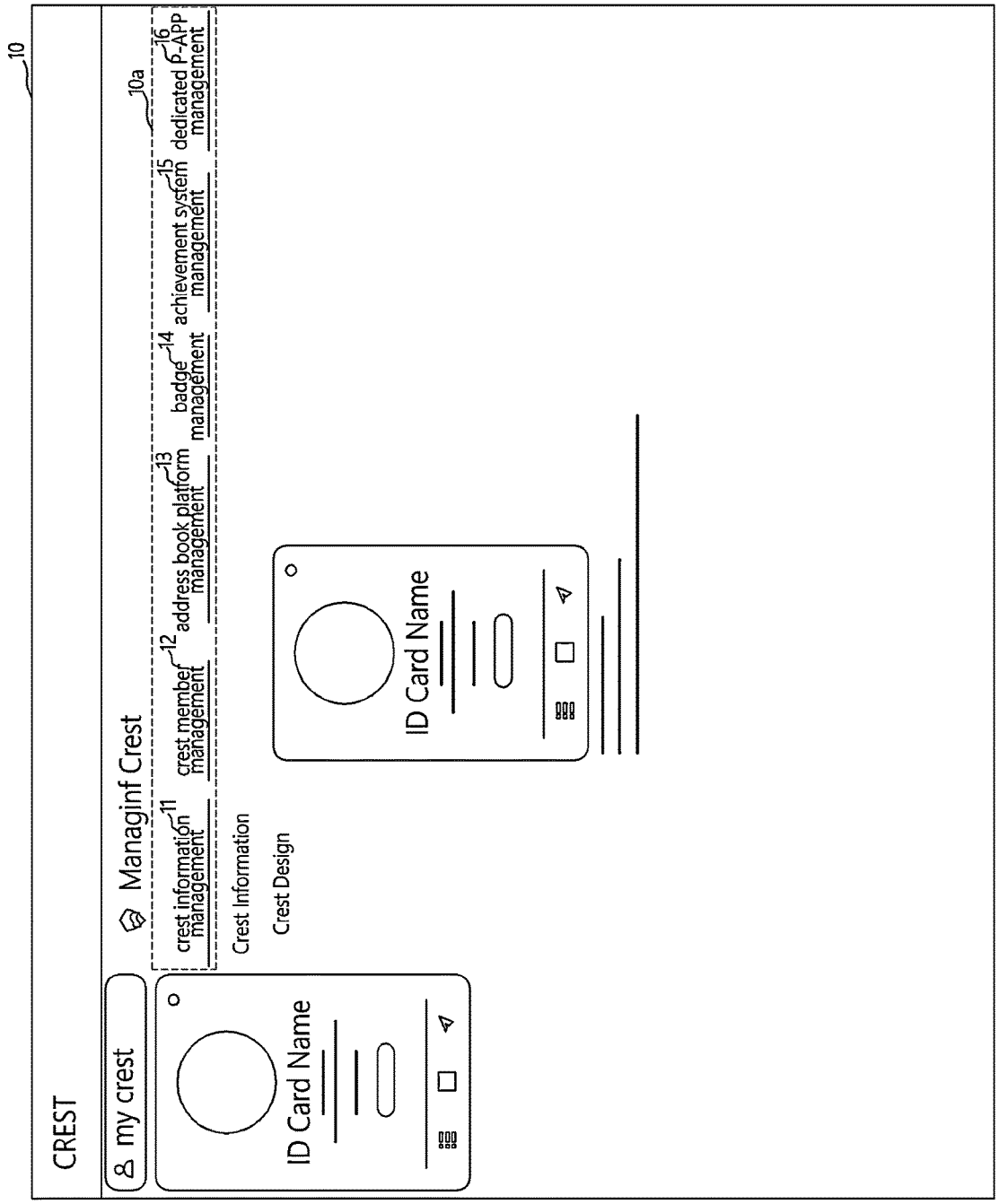

FIG. 3 shows an application main screen 10 of a group-based community system. A plurality of management menus 10a may be displayed on the main screen 10. In the present embodiment, the name group may be used interchangeably with a separate unique name "CREST." Accordingly, unless otherwise stated, "CREST" or "crest" indicated in each drawing is understood to mean the group. Similarly, in the present embodiment, the name member may be used interchangeably with the name Member.

The group management module 110 creates and manages groups for a plurality of members. To this end, a crest information management menu 11 and a crest member management menu 12 may be allocated for related functions of the group management module 110.

Figure 4:
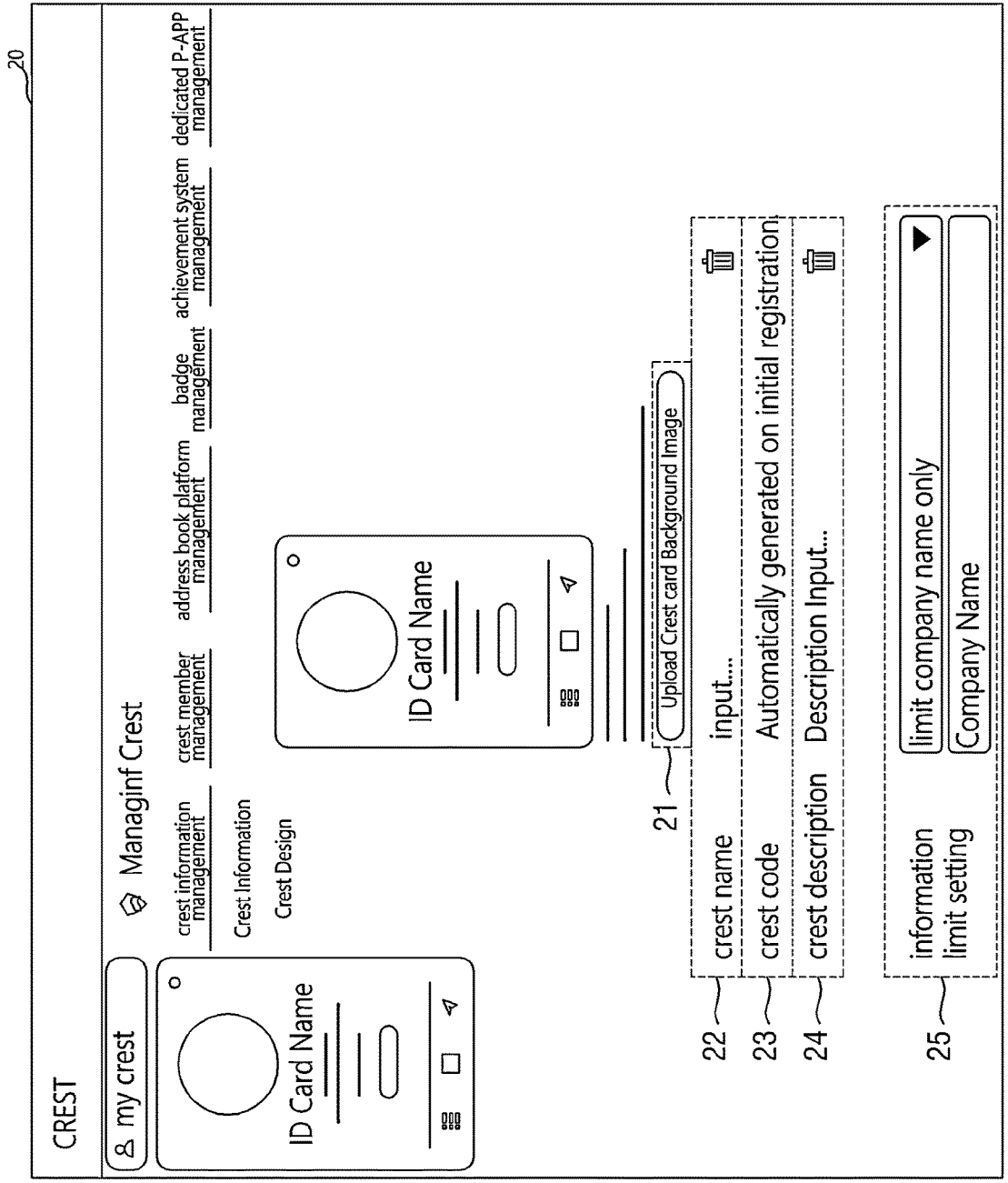

FIG. 4 is a group management screen 20 that may be entered when the crest information management menu 11 of FIG. 3 is selected, and is for explaining a group creation function and a group information editing function of the group management module 110. The group management screen 20 includes a design setting button 21, a group name setting button 22, a group code field 23, a group description setting button 24, and an information setting button 25.

The design setting button 21 is a button for setting a design of a group. When a specific image is selected or uploaded after pressing the design setting button 21, the group's background image, logo, icon, etc. are changed with the image.

As an embodiment, a design of a set group may be reflected in a personal ID card of each group member. For example, a background image of an ID card of each group member may be changed to a design of a set group. Here, the ID card may be a digital item individually assigned to each member to display a profile of each group member.

The group name setting button 22 is a button to set a group name. A user may set a group name by pressing the group name setting button 22, inputting a character to be used as the group name, and saving it.

The group code field 23 is an area for displaying a unique code of the group, and the unique code may be automatically awarded by the group-based community system when the group is initially created.

The group description setting button 24 is a button to set a detailed description of the group, and the user may set a description related to the group by pressing the group description setting button 24, and inputting and saving the detailed description of the group.

The information setting button 25 is a button to set the type of profile information to be displayed on the ID cards of each member of the group. For example, when the user presses the information setting button 25, a plurality of information items are displayed, and when the user selects one of them, information on the previously selected item is displayed on the ID card of each member. This will be further described with reference to FIGS. 5A to 5D.

FIGS. 5A to 5D show examples of setting department information among profile information by using the information setting button 25.

FIG. 5A shows a case where a "limit company name only" item is selected among a plurality of information items displayed when the information setting button 25 is pressed. Here, the meaning of "limit company name only" means that the department information on each member's ID card is limited to display only the company name. Accordingly, only the company name is displayed in the department information area of the profile information of each member's ID card.

FIG. 5B shows a case in which a "limit company name and department" item is selected from among the plurality of information items displayed when the information setting button 25 is pressed. Here, the meaning of "limit company name and department" means that department information on each member's ID card is limited to display only the company name and the department name (or the department company name). Accordingly, only the company name and the department name are displayed in the department information area of the profile information of each member's ID card.

FIG. 5C shows a case in which a "limit company name and role" item is selected from among the plurality of information items displayed when the information setting button 25 is pressed. Here, the meaning of "limit company name and role" means that department information on each member's ID card is limited to display only the company name and the role that the member is in charge of. Accordingly, only the company name and the role are displayed in the department information area of the profile information of each member's ID card.

FIG. 5D shows a case in which a "limit company name, department, and role" item is selected from among the plurality of information items displayed when the information setting button 25 is pressed. Here, the meaning of "limit company name, department, and role" means that the company name, department, and role are displayed together in the department information on each member's ID card. Accordingly, all of the company name, the department, and the role are displayed in the department information area of the profile information of each member's ID card.

Figure 6:
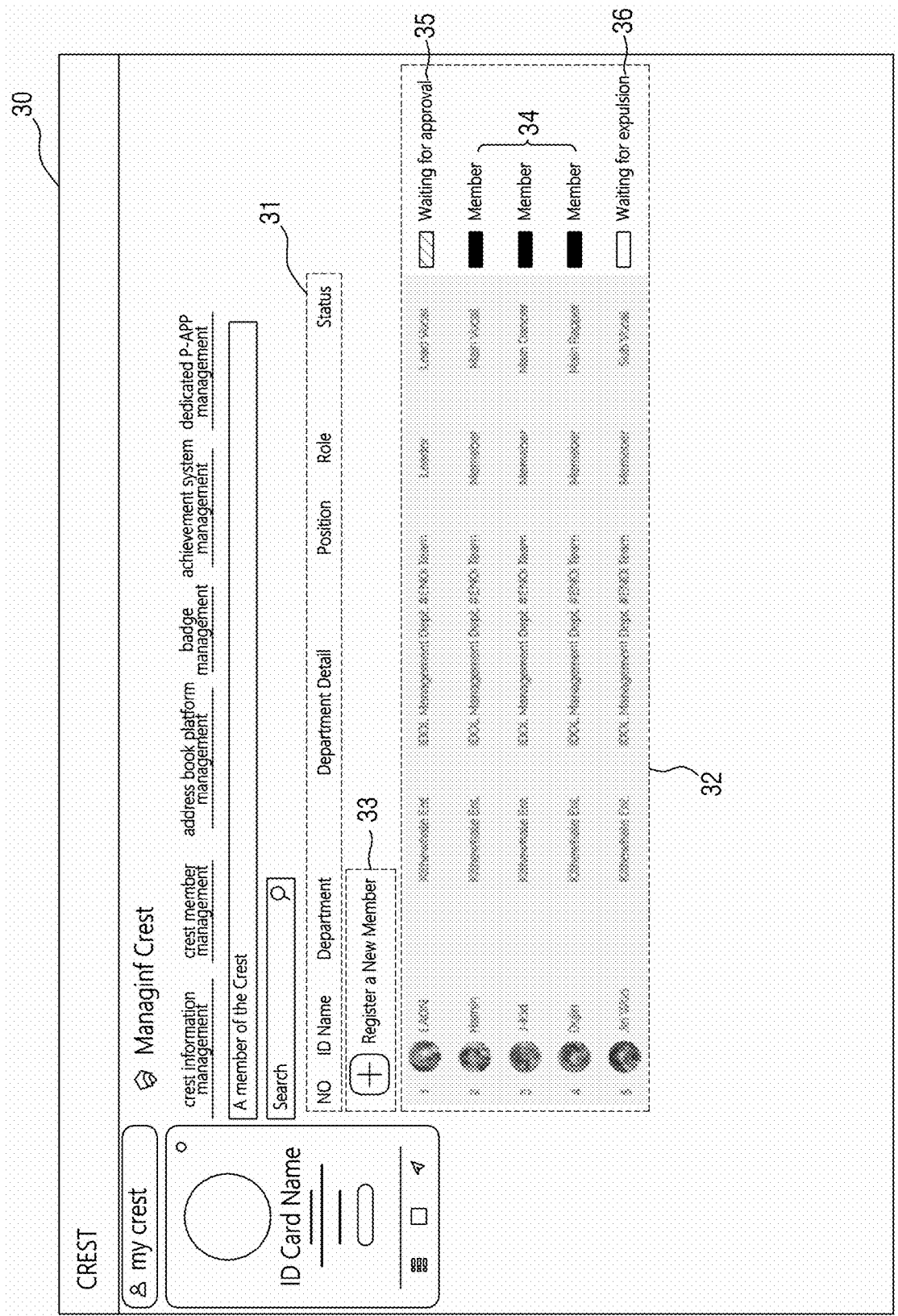

Returning to FIG. 3 again, the crest member management menu 12 will be described. FIG. 6 will be referenced for a detailed description of this. FIG. 6 is a member management screen 30 that may be entered when the crest member management menu 12 of FIG. 3 is selected, and is for explaining a member management function of the group management module 110. The member management screen 30 includes an item field 31, a member list 32, and a member registration button 33.

The item field 31 is an area for displaying items of each piece of information displayed on the member list 32. The item field 31 may include a number (NO), an ID name, a department, a department detail, a position, a role, and a status. However, it is not limited thereto.

The member list 32 is an area displaying a list of each member belonging to a current group. In the member list 32, information items defined in the item field 31 for each member are displayed, respectively.

As an embodiment, status information displayed on the member list 32 may indicate a membership progress status of each member. Specifically, in the case of a member belonging to a group, when status information is displayed as a member (34) and the member is not yet in the group but a membership procedure is in progress, the status information may be displayed in In Progress or Waiting for approval (35). For example, in adding a new member to a group, when deciding whether to add the new member to the group based on the result of a vote of existing members of the group (i.e., voting for or against accepting the new member into the group), status information may be displayed as pending approval when the voting of existing members is not yet completed.

In addition, for members who are still in a group but are in a process of expulsion, the status information may be displayed as Waiting for expulsion (36).

The member registration button 33 is a button for adding a new member to a group. A user may call a menu for adding a member by pressing the member registration button 33, and then may add a new member to a group by searching and selecting a member to be added in the group-based community system.

The user may additionally inquire detailed information on each member on the member management screen 30. This will be described with reference to FIG. 7.

Figure 7:
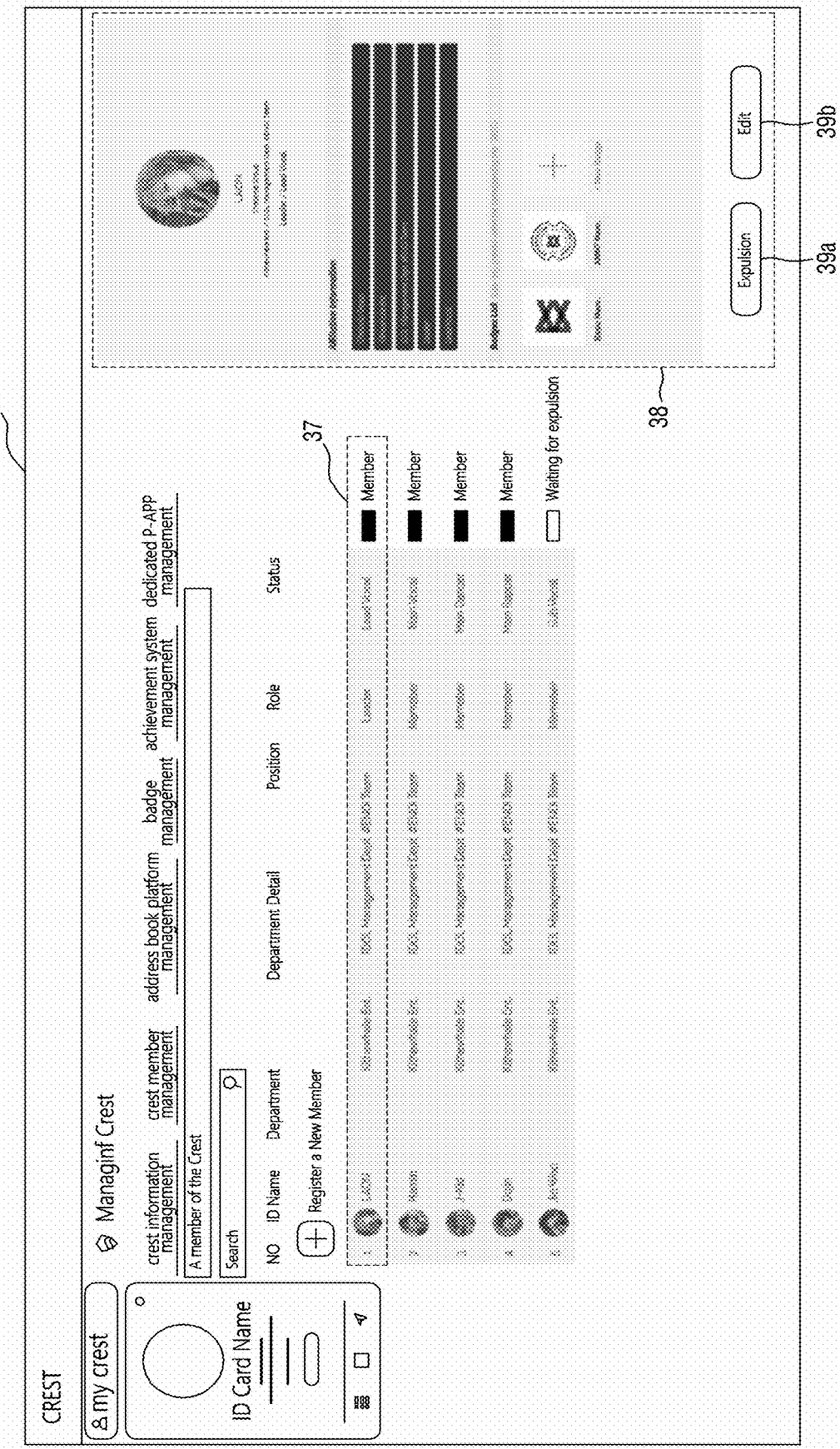

In FIG. 7, when the user selects one member 37 from among the listed members, detailed information 38 on the member 37 is displayed on the right side of the member management screen 30. Through this, the user may check each information item for the selected member 37 in more detail.

As an embodiment, the detailed information 38 may additionally display management menus 39*a* and 39*b* for the member 37. For example, the user may withdraw the member 37 from the group by using an expulsion button (Expulsion) 39*a* at the bottom of the detailed information 38. In addition, the user may modify and edit profile information of the member 37 by using an edit button (Edit) 39*b* at the bottom of the detailed information 38.

Figure 8:
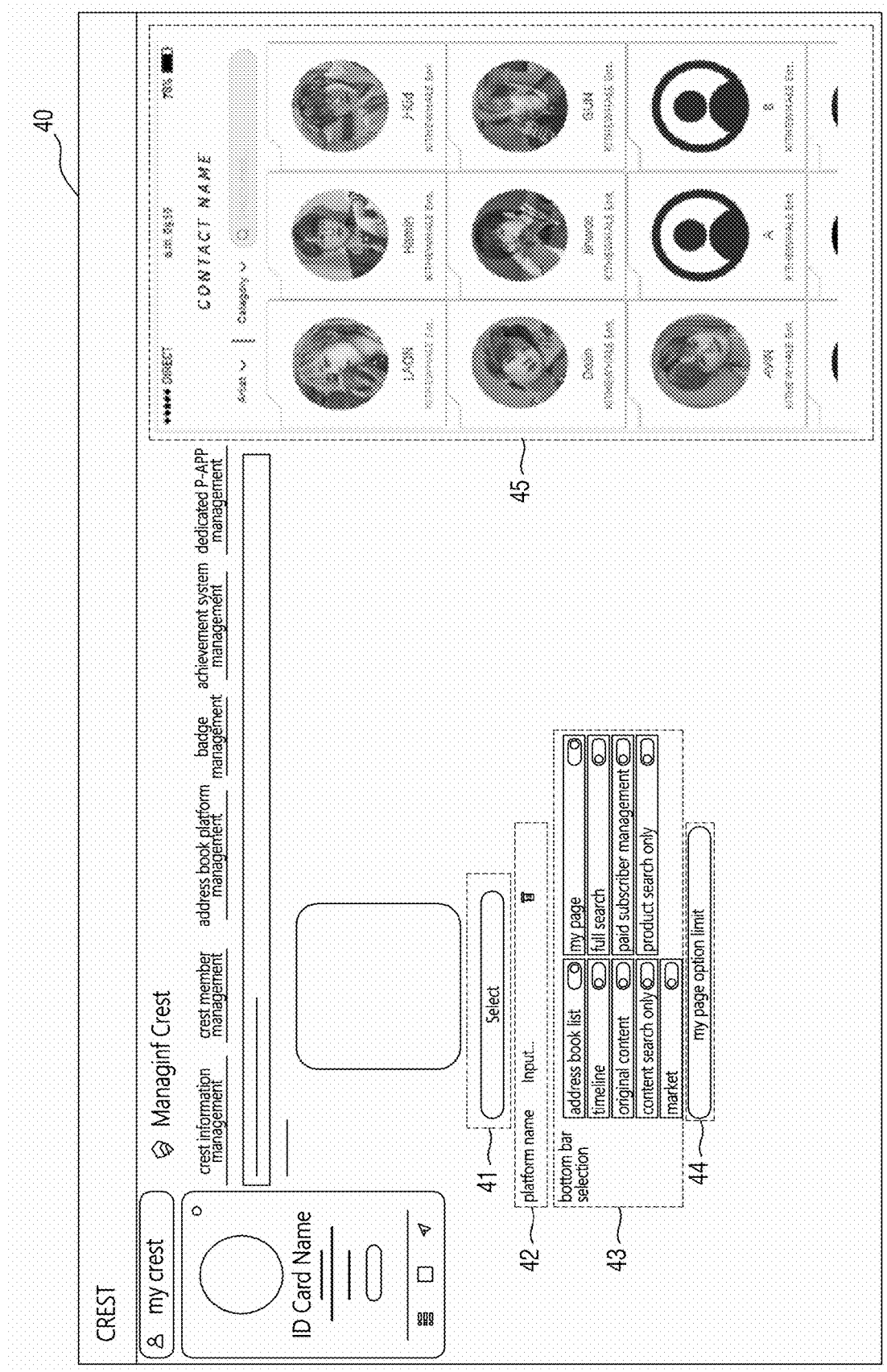
FIG. 8 is an exemplary diagram for explaining a function of a community management module 120 according to an embodiment of the disclosure.

FIG. 8 is an exemplary diagram for explaining a function of a community management module 120 according to an embodiment of the disclosure. FIG. 8 is a platform management screen 40 for creating and managing an address book platform as an example of a community platform, which may be entered when an address book platform management menu 13 of FIG. 3 is selected.

Herein, it is assumed that the community platform is an address book platform, and related contents are described, but the scope of the disclosure is not limited thereto. For example, the group-based community system may manage a platform for sharing video content or an SNS platform instead of an address book platform in the same manner as described in FIG. 8.

In addition, although the description is focused on one community platform for simplicity of description, the scope of the disclosure is not limited thereto. For example, a plurality of community platforms may be created and managed, and multiple community platforms may register the same user as their members, respectively. In addition, each community platform may award one or more different badges to its members.

Referring to FIG. 8, the platform management screen 40 includes a design setting button 41, a platform name setting button 42, a bottom bar selection area 43, and an option limit button 44.

The design setting button 41 is a button for setting and editing design elements such as a background screen or a logo of the community platform (here, the address book platform). The user may set the background screen or logo of the community platform by pressing the design setting button 41 to select an image to be registered.

The platform name setting button 42 is a button for setting the name of the community platform. The user may set a community platform name by pressing the platform name setting button 42, inputting a character desired to be used as the name of the community platform, and saving it.

The bottom bar selection area 43 is an area for setting menu items of the community platform. Here, for convenience of explanation, setting of a bottom bar menu is illustrated, but the scope of the disclosure is not limited thereto. It may be applied to setting various menu items of the community platform, such as a side bar menu or a top menu.

The community management module 120 configures the bottom bar menu of the community platform with items selected by the user from among several menu items displayed on the bottom bar selection area 43.

The option limit button 44 is a button for setting option menus on the community platform. For example, when the community platform is an address book platform and a button for requesting an audition is to be added on the address book platform, an audition request button may be added through the option limit button 44. In addition, various options may be set through the option limit button 44.

On the right side of the platform management screen 40, a preview 45 of the community platform being created or modified (here, the address book platform) may be displayed together.

Figure 9:
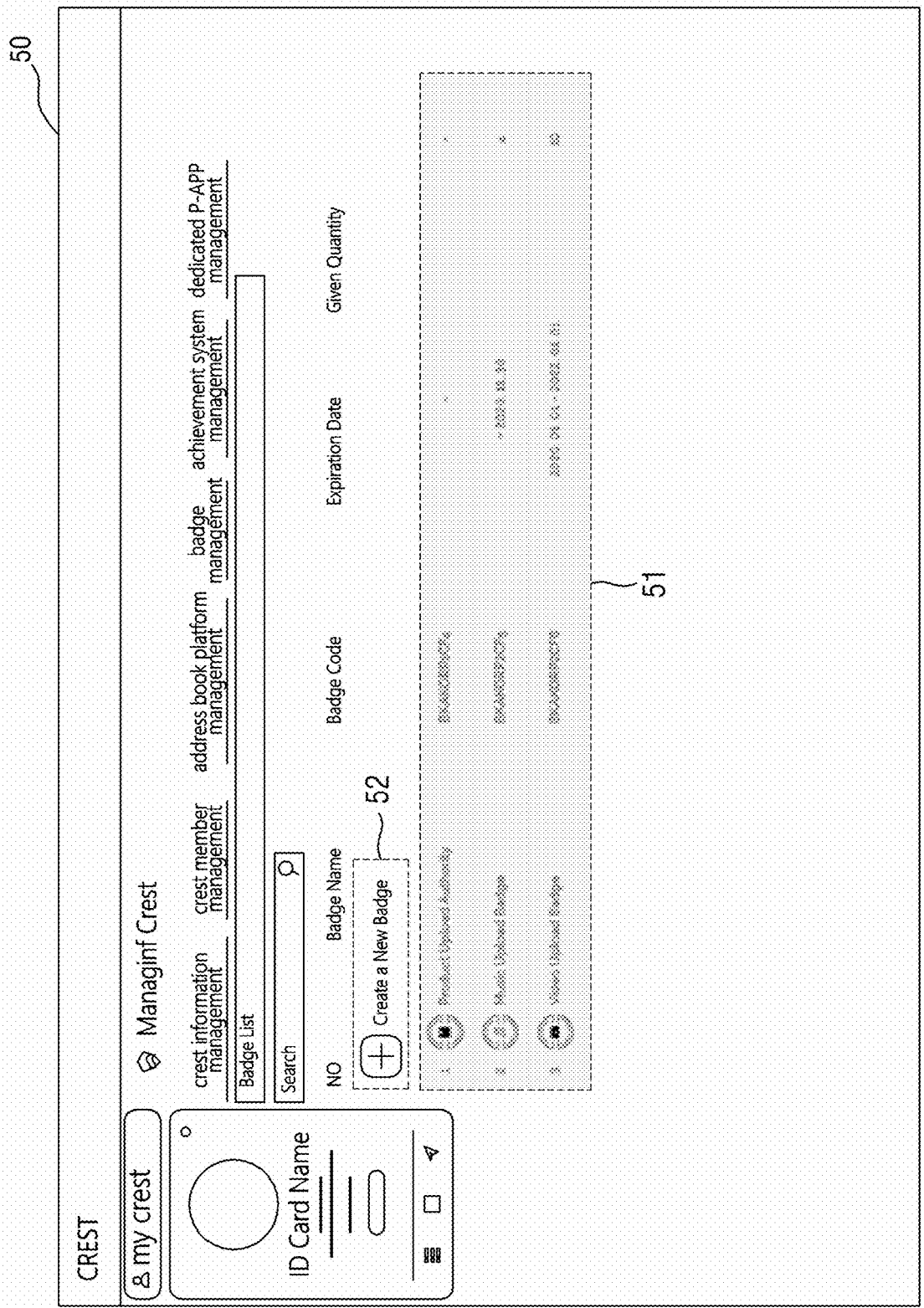
FIGS. 9 to 14 are exemplary diagrams for explaining a function of a badge management module 130 according to an embodiment of the disclosure.

FIGS. 9 to 14 are exemplary diagrams for explaining a function of a badge management module 130 according to an embodiment of the disclosure. FIG. 9 is a badge management screen 50 that may be entered when the badge management menu 14 of FIG. 3 is selected, and includes a badge list 51 showing information of currently created badges and a badge creation button 52 for creating a new badge.

As mentioned above, the badge is an item for indicating or approving the rights (or access rights) of each member to functions within the community platform (e.g., address book platform). Certain functions that require separate privileges (e.g., uploading content, selling content, editing content, selling products, listing on the address book platform, or various other special functions, etc.) can only be used by members who have the badge of that function.

Referring to FIG. 9, it may be seen that a product upload badge, a music upload badge, and a video upload badge are respectively listed in the badge list 51. In this case, each member must have a product upload badge to upload a product, a music upload badge to upload music, and a video upload badge to upload video.

In addition to the badge shown in FIG. 9, various badges may be applied. For example, there may be a "music source purchase authentication badge" that is awarded when a member of the community platform purchases a music source (or content). This will be described in more detail through specific examples.

The music source purchase authentication badge is awarded to a member when a member purchases a specific music source (or content). The member who owns the music source purchase authentication badge has additional functions and rights to the music source (i.e., the music source purchased by the member) corresponding to the music source purchase authentication badge.

For example, a member is given the rights for a function (playlist addition function) to add a music source purchased by the member to the member's playlist, the rights to place and post playlists with the music source added to the member's personal SNS space, or a function to receive the corresponding profit according to a predetermined ratio when the music source generates profit through streaming service, through the music source purchase authentication badge.

In addition, when there is a hidden track or hidden video related to the music source, only members who own the music source purchase authentication badge of the corresponding music source may add the hidden track or hidden video to their playlist, place and post it in their personal SNS space, or play the hidden track or the entire running section of the hidden video.

In this case, a member who does not own the music source purchase authentication badge can only play a general music source, not the hidden track or hidden video. Even if the member is playing the hidden track or hidden video, access rights are limited so that only a preview section may be played, not the entire running section. Moreover, even when playing the general music source or playing the hidden track or the preview section of the hidden video, an access route to the music source or the preview section is limited so that the member who does not own the music source purchase authentication badge are only available when they watch an advertisement for music source playback or subscribe to a flat-rate streaming service.

These badges may be created, edited, or deleted as needed. If one wants to create a new badge, one may proceed by pressing the badge creation button 52. A method for creating a new badge will be described with reference to FIG. 10.

Figure 10:
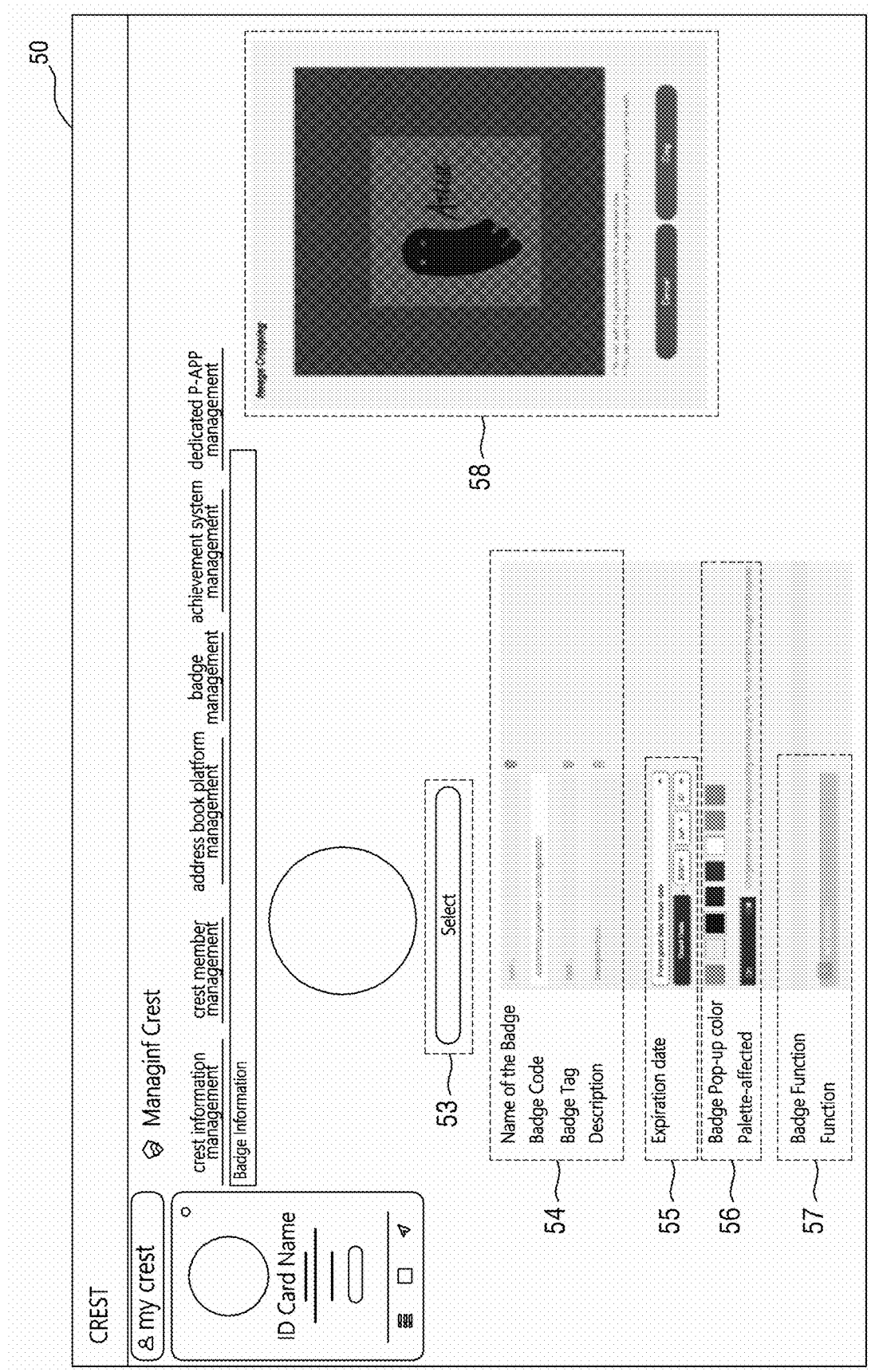
Figure 11:
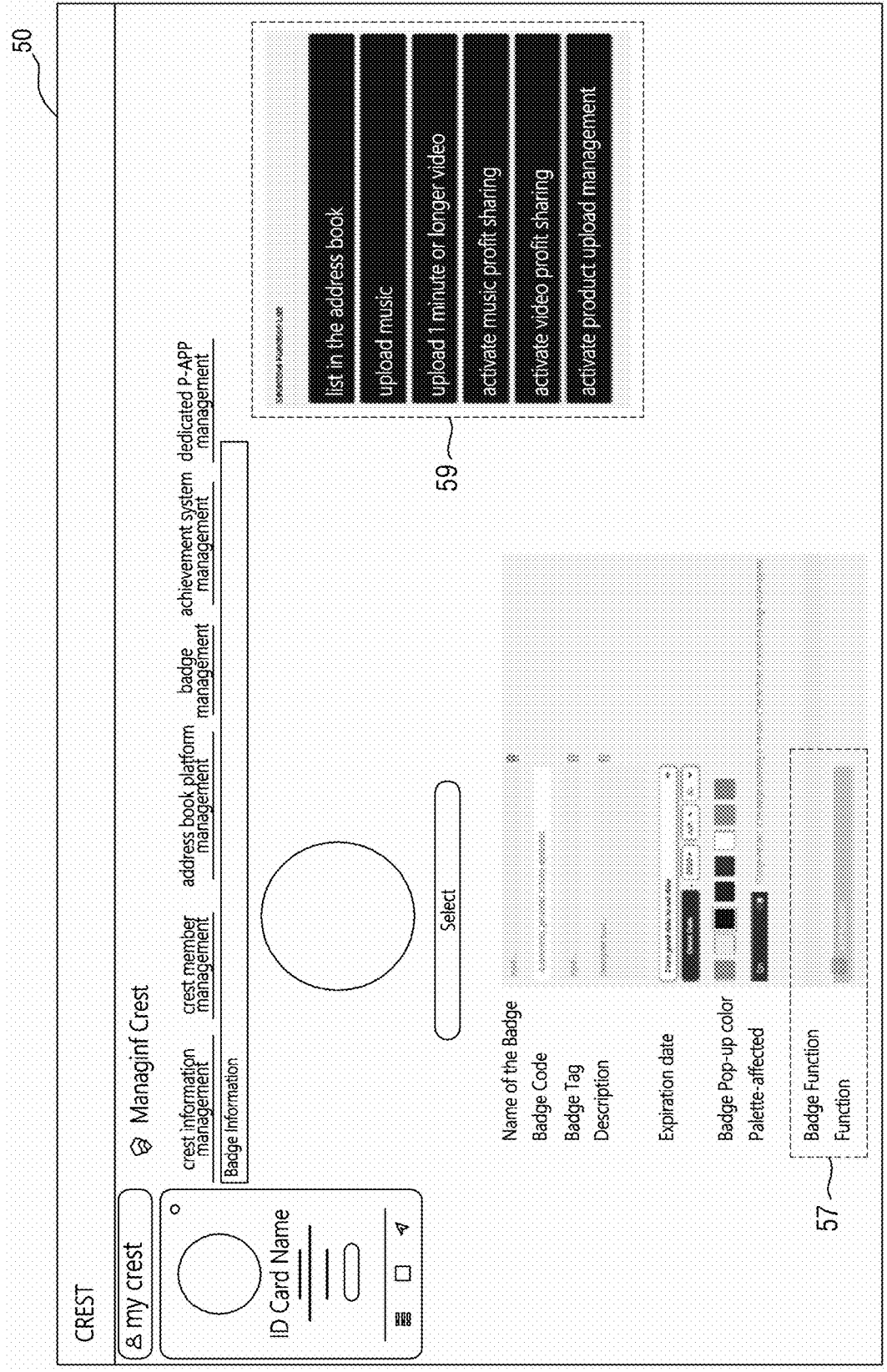

FIG. 10 is a diagram showing the badge management screen 50 when the badge generation button 52 is pressed. Referring to FIG. 10, the badge management screen 50 includes a design setting button 53, a badge information setting area 54, an expiration date setting area 55, a color setting area 56, and a badge function setting area 57. Here, on the right side of the badge management screen 50, a preview area 58 of a badge being created may be displayed together.

The design setting button 53 is a button for setting a design of the badge. When a specific image is selected or uploaded after pressing the design setting button 53, a representative image or logo of the badge is set as the image.

The badge information setting area 54 is an area for inputting various types of information on the badge. For example, the user may input and display a badge name, a badge tag, or a detailed description of the badge through the badge information setting area 54. As an embodiment, a unique code of the badge may be displayed together in the badge information setting area 54. Here, the unique code of the badge may be automatically awarded by the group-based community system when creating the badge.

The expiration date setting area 55 is an area for setting an expiration date during which the badge is activated. The user may set the expiration date for the badge. In this case, the badge is only valid within the set expiration date and becomes invalid if it exceeds the expiration date.

As an embodiment, the expiration date of the badge may be set in various ways. One may set the expiration date of the badge in a variety of ways, for example, by entering a starting point and a total duration of the expiration date, or entering a start point and an end point of the expiration date, respectively.

As an embodiment, the expiration date of the badge may be set indefinitely (or there is no time limit). In this case, unless the expiration date of the badge is adjusted separately, the badge is always valid and will not expire as the period elapses.

The color setting area 56 is an area for setting a color of the badge. The user may set the color of the badge, set a background color of a pop-up image of the badge, or set a font color of the pop-up image of the badge, through the color setting area 56.

As an embodiment, the color setting area 56 may include an affected button. Here, the effected button is a button that sets an option to change the color of the badge in conjunction with a color of a space to which the badge is applied.

The badge function setting area 57 is an area for setting a function or right to be provided by the badge. This will be described with reference to FIG. 11.

When the user selects the badge function setting area 57, a list 59 of functions (or rights) that may be set on the badge is displayed on the right side of the badge management screen 50. When the user selects a desired function from the displayed function list 59, the selected function is set on the badge, and the member who has been awarded the badge may use the function set in the community platform.

For example, when the user selects a music upload function from the function list 59, the music upload function is set on the badge being created. Thereafter, the user who received the badge may use the music upload function on the community platform.

The user may additionally search for detailed information on the badge created on the badge management screen 50. This will be described with reference to FIG. 12.

Figure 12:
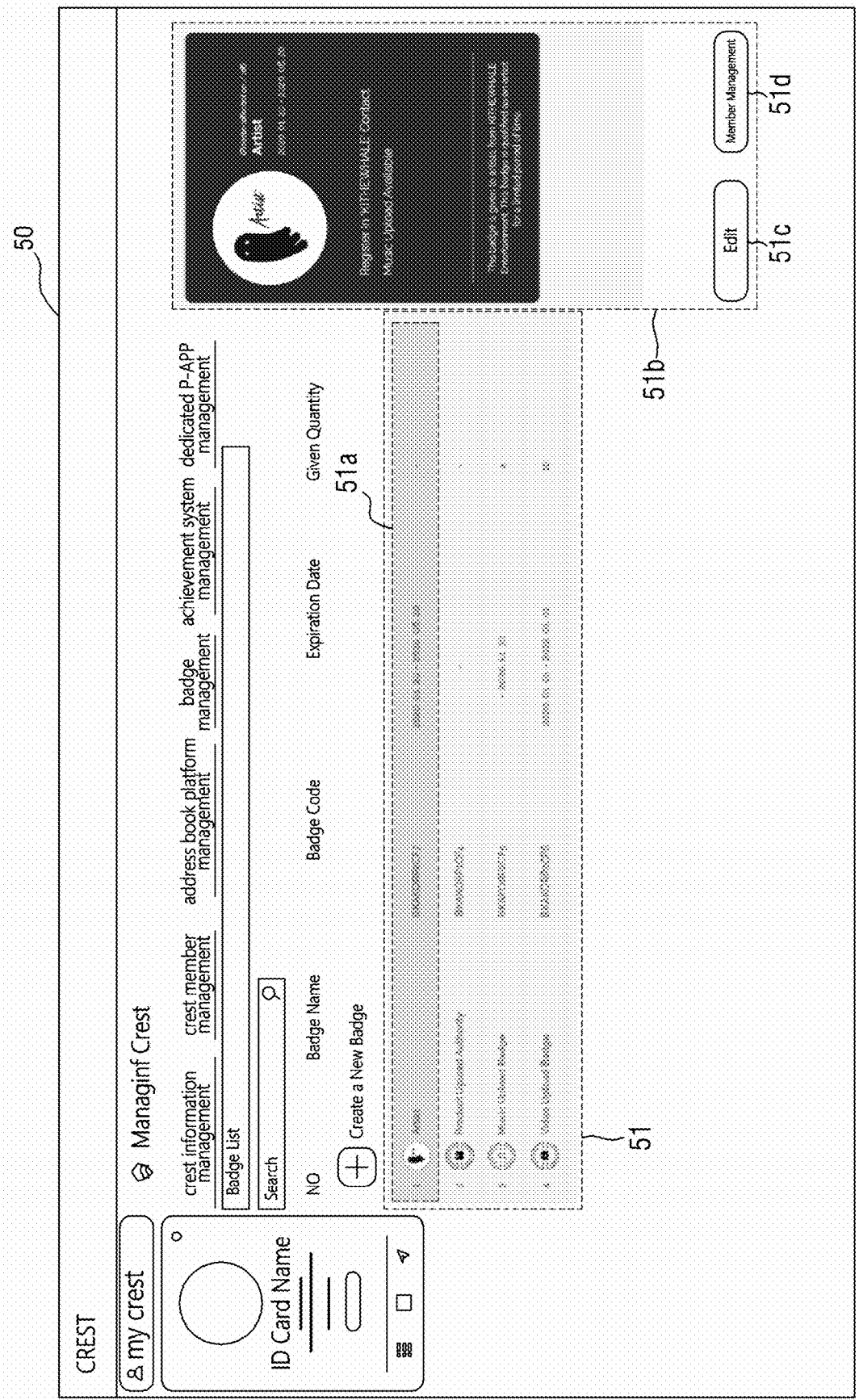

In FIG. 12, when the user selects any one badge 51a of badges listed in the badge list 51, detailed information 51b for the badge 51a is displayed on the right side of the badge management screen 50. Through this, the user may check each information item for the selected badge 51a in more detail.

As an embodiment, management menus 51c and 51d for the badge 51a may be additionally displayed on the detailed information 51b.

As an embodiment, the user may modify the information, functions, and rights of the badge 51a by using an edit button 51c below the detailed information 51b. For example, information such as a name, information, and an expiration date of the badge may be modified by using the edit button 51c. In addition, some of functions (or rights) set on the badge may be excluded (or deleted) or new functions may be added.

In addition, the user may award the badge 51a to a group member by using a member management button (Member Management, 51d) at the bottom of the detailed information 51b or retrieve the badge 51a from the group member who has the badge 51a. Or, the profile information may also be modified or edited. This will be described with reference to FIG. 13.

Figure 13:
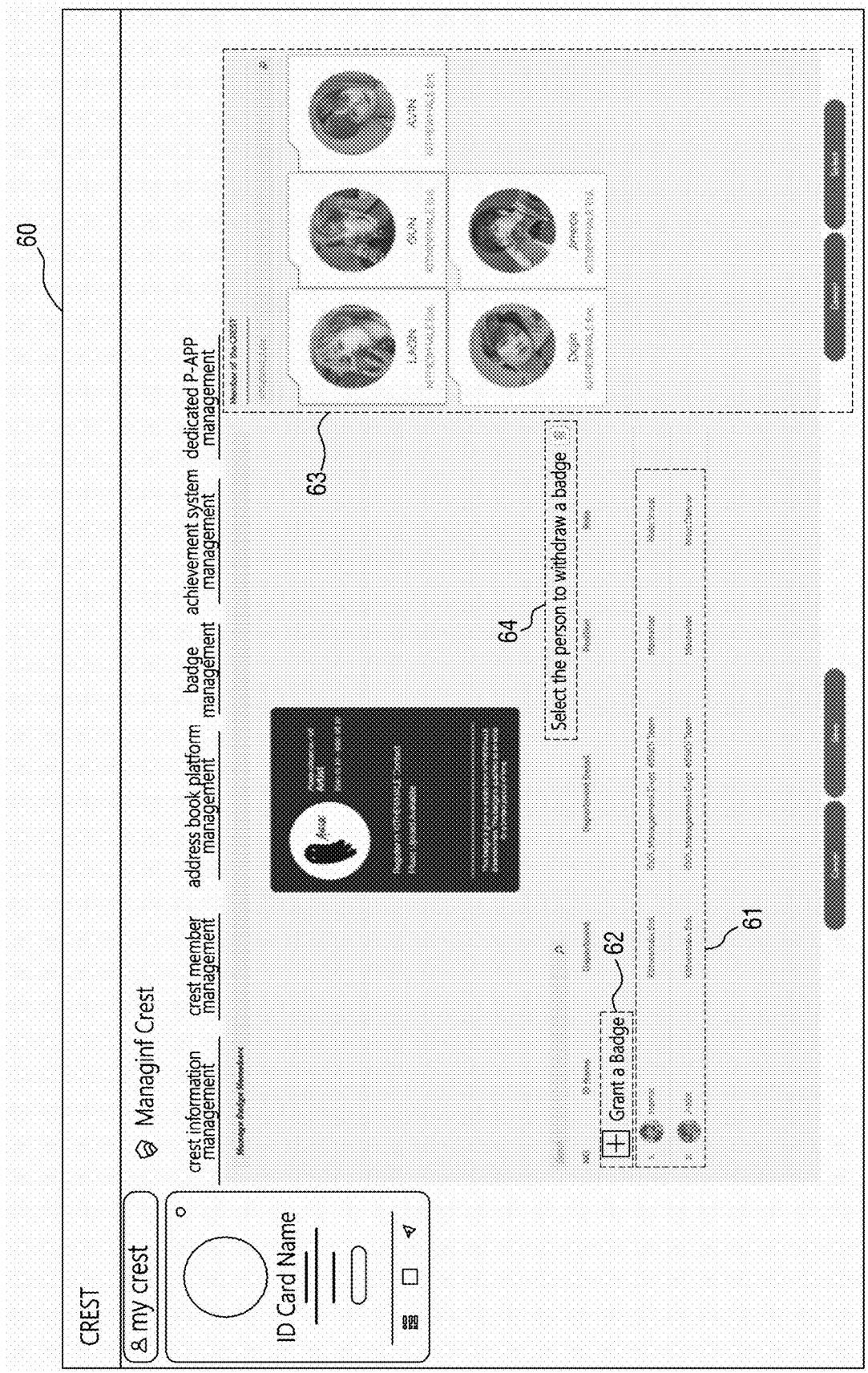

FIG. 13 is a badge distribution screen 60 displayed when the member management button 51d is selected. The badge distribution screen 60 includes a member list 61, a badge award button 62, and a badge retrieval button 64.

The member list 61 is an area displaying a list of existing members who currently have a badge.

The badge award button 62 is a button for newly awarding a badge to another member. When the badge award button 62 is selected, a member search area 63 is displayed on the right side of the badge distribution screen 60. In the member search area 63, other members who do not have a badge are displayed by search or by default, and when the user selects a member to be awarded a badge, the badge is awarded to the selected member. A member who has been awarded the badge will be newly listed in the member list 61.

The badge retrieval button 64 is a button for retrieving badges from members who currently have badges. After selecting the badge retrieval button 64, when a member to retrieve a badge is selected from the member list 61, the badge is retrieved from the selected member. The member whose badge has been retrieved will be removed from the member list 61.

As an embodiment, when an individual member is selected from the member list 61, a badge holding status of the selected member may be inquired in detail. This will be described with reference to FIG. 14.

Figure 14:
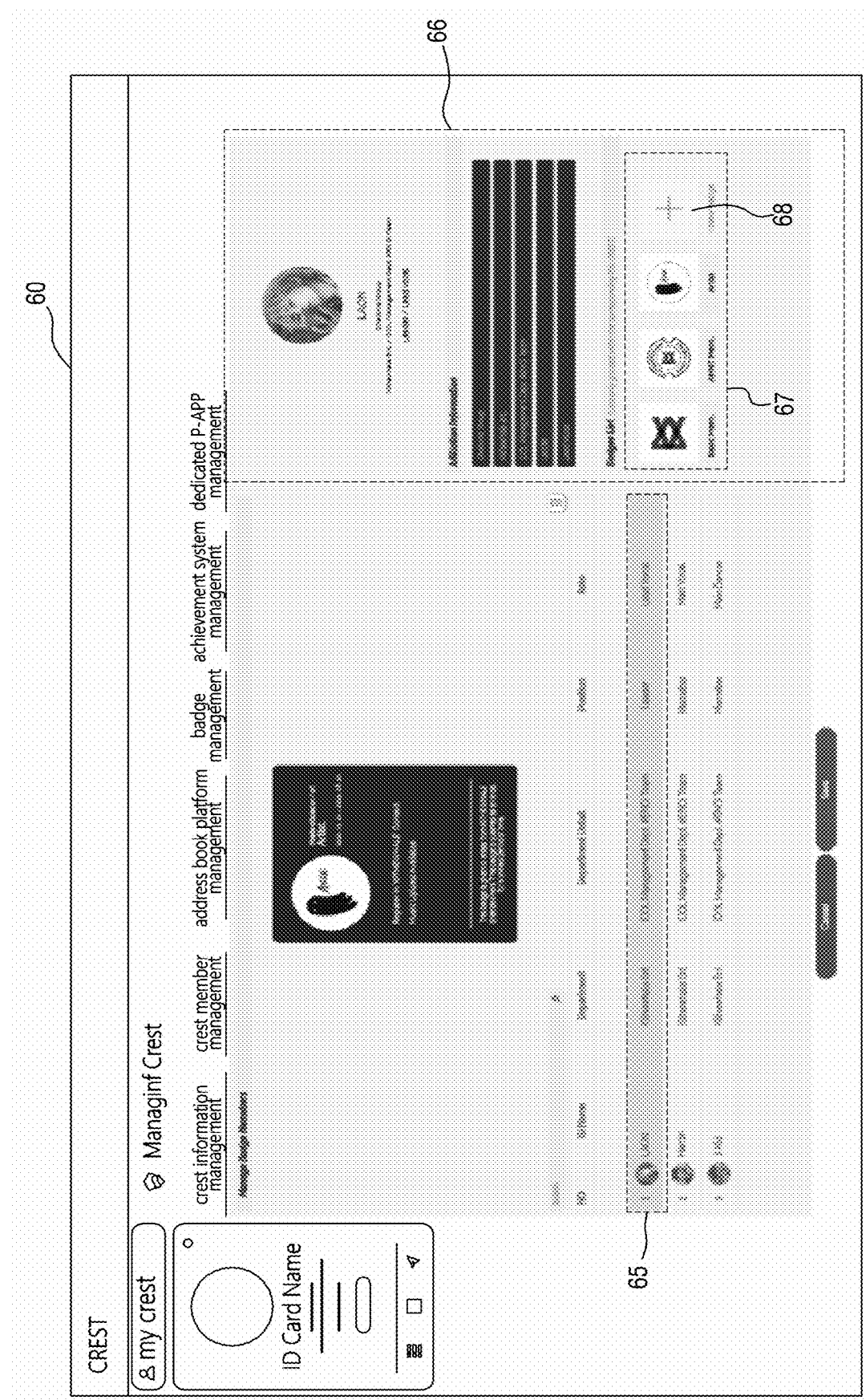

FIG. 14 shows the badge distribution screen 60 when an individual member 65 is selected from the member list. In response to selecting the individual member 65, badge status information 66 showing badge information held by the selected member 65 is displayed on the right side of the badge distribution screen 60. A badge list 67 showing badges currently owned by the member 65 is displayed in the badge status information 66. Here, one side of the badge list 67 may also include a simple award button 68 for awarding a new badge to the member 65. When a new badge is to be awarded to the member 65, the user may conveniently award the new badge by selecting the simple award button 68.

Figure 15:
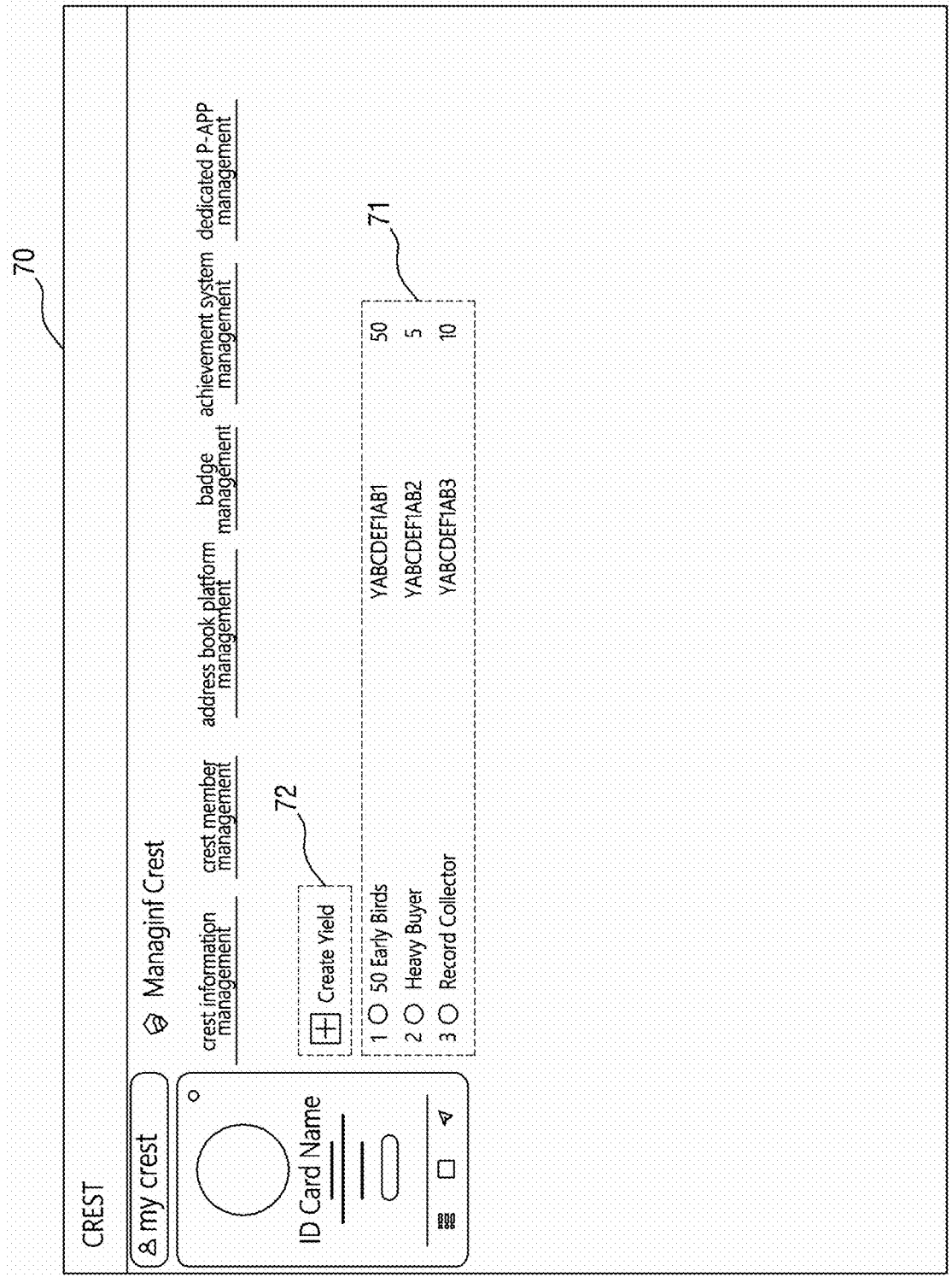
FIGS. 15 and 16 are diagrams for explaining various additional functions, such as an achievement management function for supporting activities in a community platform and a P-APP management function of an address book platform, according to an embodiment of the disclosure.
Figure 16:
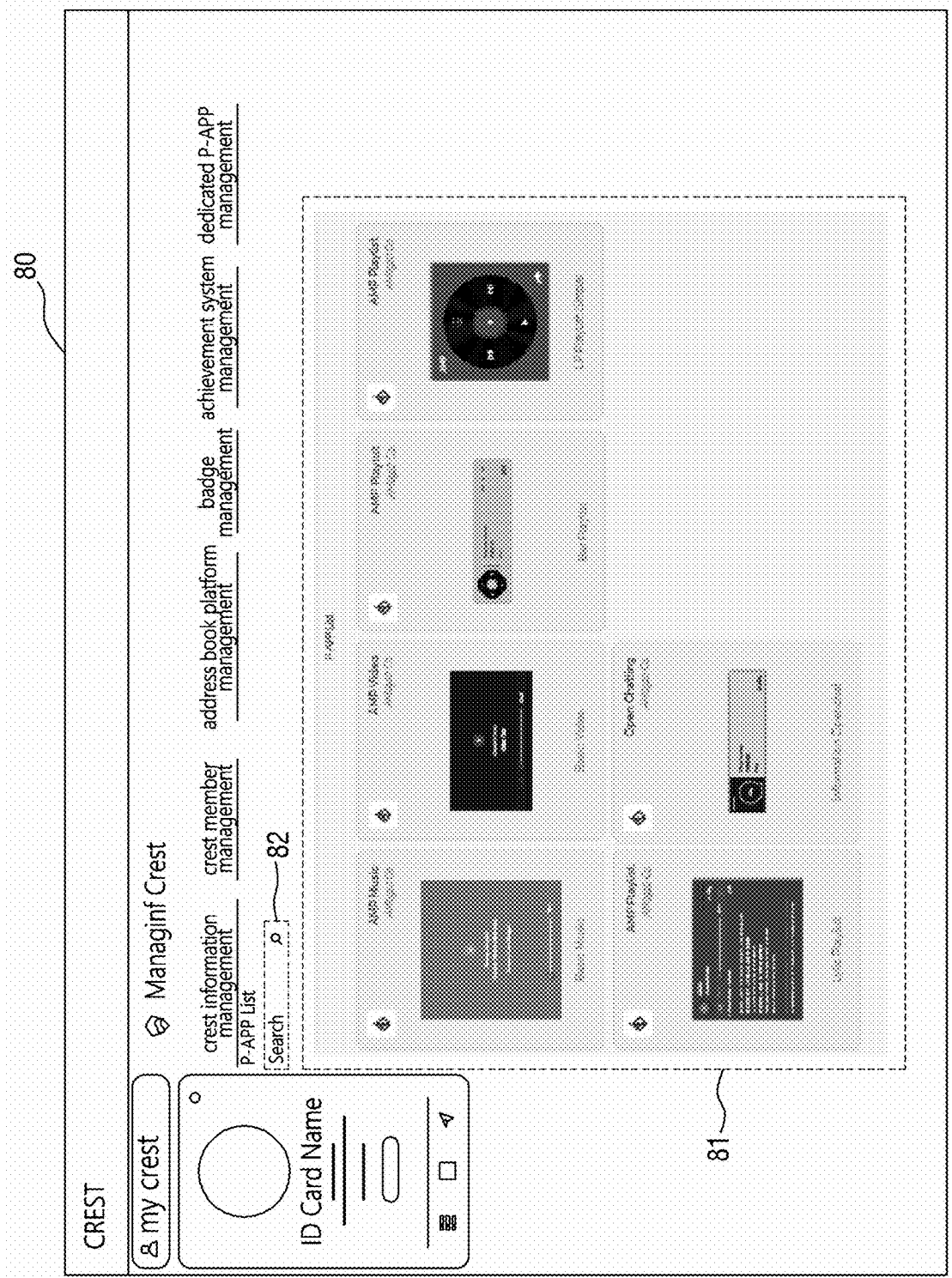

FIGS. 15 and 16 are diagrams for explaining various additional functions, such as an achievement management function for supporting activities in a community platform and a P-APP management function of an address book platform, according to an embodiment of the disclosure. FIG. 15 shows an achievement function that encourages active activity within the community platform. FIG. 16 shows a function of providing various application programs that may increase the usability of the community platform. It will be described below with reference to the drawings.

FIG. 15 is an achievement management screen 70 for explaining the achievement function of the group-based community system, which may be entered by selecting an achievement system management button 15 of FIG. 3. Achievements are digital items to indicate that members have achieved a certain standard by accumulatively performing various activities on the community platform. For example, if a member has accumulated 50 content uploads, the member may be awarded an achievement item indicating that the number of uploads has been reached, and the awarded achievement item may be displayed on the member's ID card or profile. Through this, members may openly reveal their achievements to others, and are given positive motivation for their activities within the community platform.

The achievement management screen 70 may include an achievement list 71 displaying currently created achievement items and an achievement creation button 72 for creating a new achievement item.

The achievement list 71 displays information on achievement items created by the group-based community system for activities in the community platform. Names, achievement codes, and quotas of each achievement item may be sequentially displayed in the achievement list 71. The quota is the maximum number of members that may be awarded the achievement item.

For example, for an achievement item listed second in the achievement list 71, a name of the achievement item is 'Heavy Buyer,' which is an achievement item awarded when a large amount of goods (or content) is purchased. An achievement code thereof is YABCDEF1AB2, an achievement quota is 5, and the achievement item may be awarded to a maximum of 5 members.

Here, the achievement code may be a code that is automatically awarded by the group-based community system when the achievement item is initially created, as in the case of the badge code described above.

When a new achievement item is to be added, a new achievement item may be created through the achievement creation button 72, and the created achievement item is added to the achievement list 71.

A method for creating a new achievement item is similar to a method for creating a new badge previously. In other words, through the achievement creation button, an achievement creation screen (or menu) is called. Then, an achievement is created by entering a design, name, detailed description, or achievement quota of the achievement item using a button or area displayed on the achievement creation screen.

As an embodiment, when creating an achievement item, a condition for acquiring an achievement (e.g., purchasing a product 50 or more times) may be input. In this case, the achievement item may be selectively awarded only to a member who has achieved an activity corresponding to the condition in the community platform.

As an embodiment, when creating an achievement item, an advantage that may be received when having the achievement item may be additionally input. In this case, a member who has been awarded the achievement item may receive benefits according to the advantage (for example, a 10% mileage accrual rate is added when purchasing a product) when being active in the community platform.

FIG. 16 is a P-APP management screen 80 for managing various application programs usable in the community platform.

Here, the P-APP refers to an application program used in the community platform, and may be a standalone application program such as a widget.

The P-APPs management screen 80 may include a P-APPs list 81 representing P-APPs currently in use or holding and a search window 82 for searching for P-APPs in the server 100.

Information on the currently-owned P-APP is displayed along with a thumbnail in the P-APP list 81. Here, the P-APP means a unique name that refers to an application that may be used on the community platform. The P-APP may include various kinds of applications. For example, the P-APP may include various types of P-APPs, such as a music-playing P-APP, a video-playing P-APP, a playlist P-APP, or an open chat P-APP.

When a new P-APP is to be added to the P-APP list 81, a desired P-APP may be searched by entering a name, function, type, keyword, or creator of the P-APP to be searched in the search window 82. Then, if one selects and downloads a P-APP that one wants to add among the searched P-APPs, the P-APP is added to the P-APP list 81. Here, when the P-APP is a paid P-APP, one may download the P-APP after going through a predetermined payment process.

Figure 17:
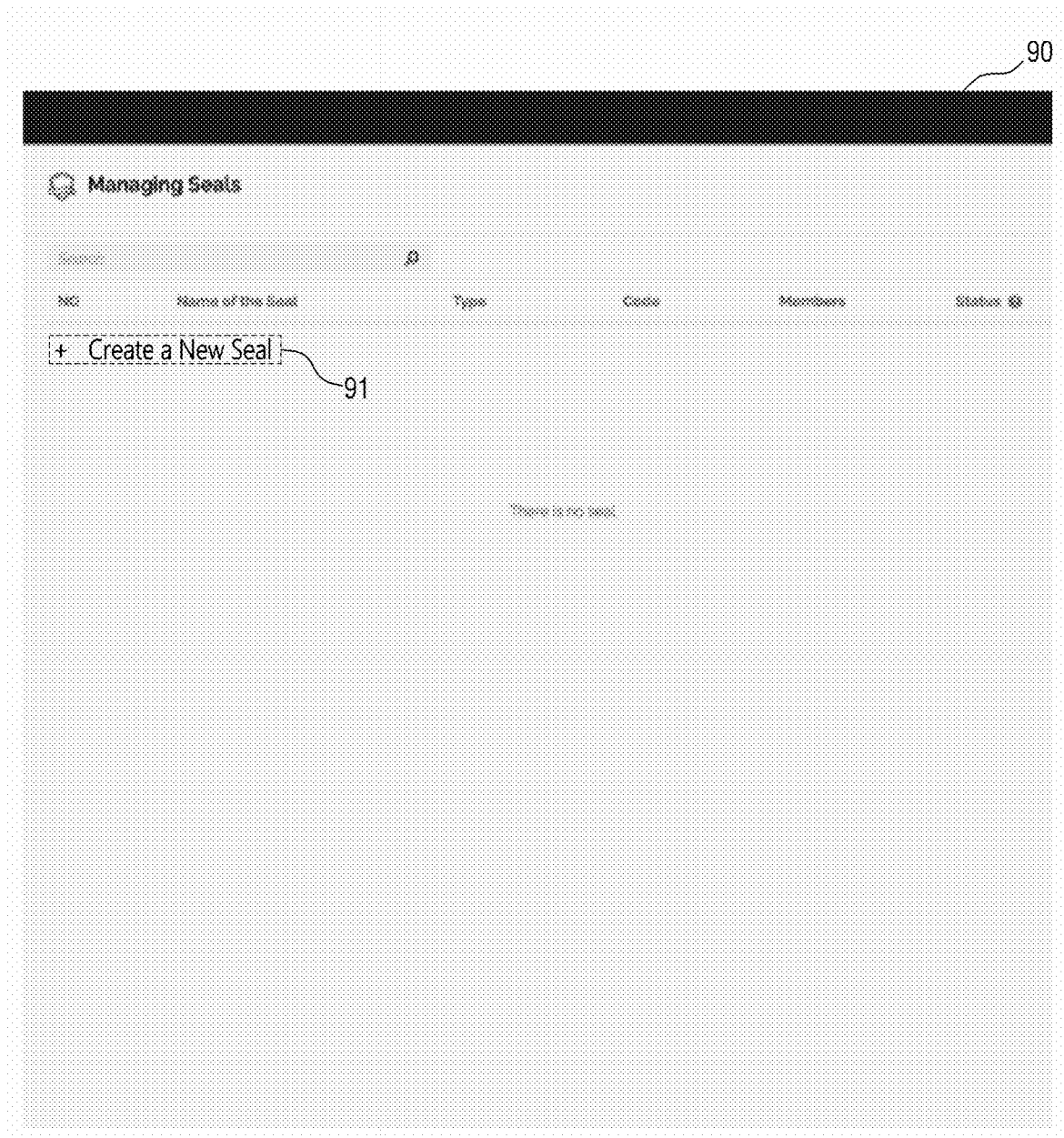
FIGS. 17 to 24 are exemplary diagrams for explaining a function of a contract management module 140 according to an embodiment of the disclosure.

FIGS. 17 to 24 are exemplary diagrams for explaining a function of a contract management module 140 according to an embodiment of the disclosure. FIG. 17 is a seal management screen 90 creating and showing a seal for contract management. Here, the seal is an item representing the rights relationship between group members for a specific content and its contents, and performs a function of a kind of digital contract.

Specific content or products may be an object of a contract that defines the relationship of rights through the seal. In this case, the parties to the contract (or group members) in which the relationship of rights is defined through the seal may include producers of specific content or products, publicity, etc. The seal is linked to accounts of the contracted members, and when profits are generated based on a contract object, profits are automatically distributed to the accounts of each contracting party according to the rights relationship specified in the seal. The seal is affixed to the contract object or registered with the contract object to publicly disclose the rights relationship specified in the seal, while the profit distribution and contract are referred to transparently in accordance with the defined rights relationship.

As a specific example of this, assume that group members A, B, C, D, and E participated in the production of one music content. Here, each member creates a seal containing the following contract details.

1. Only A, B, and C participated in the production of music content, and their contributions were set at 40%, 30%, and 30%, respectively. When music profit is generated based on the music content, A, B, C, D, and E receive a distribution of the music profit generated at a rate of 40%, 30%, 30%, 0%, and 0%, respectively, depending on their contribution.

2. In the sales of music contents related products, A, B, C, D, and E all participated in promotion, and their contributions were set at 10%, 10%, 10%, 40%, and 30%, respectively. When related products of the music content are sold and sales profit is generated, A, B, C, D, and E receive a distribution of the sales profit generated at a rate of 10%, 10%, 10%, 40%, and 30%, respectively, depending on their contribution.

When this type of seal is created and attached to contents and product sales pages, the related profits are distributed to A, B, C, D, and E according to the rights relationship specified in the seal (in this case, a profit distribution ratio) for music source profit and sales profit generated after that.

The seal is basically used to define the rights relationship between members of the attached content, but it may additionally be used to give members specific rights for the attached content. Examples related to this will be described in detail.

Assume that Member A and member B belong to the same group (or crest), after A and B co-produced content X, they stipulated a distribution of profit and other rights to X through a seal, and only A owns a badge (that is, a music sales badge) that may sell content within the community platform. In this case, in principle, only A has the right to sell an album, so only A may register and sell X in an online market of the community platform, and when X is sold, B only receives sales profits according to the seal attached to X. However, when B has high public awareness or A and B belong to different community platforms, and if B is given the right to sell X, X's distribution channels will be diversified, which will greatly contribute to X's sales.

Accordingly, in the present embodiment, when A and B create a seal, a method for adding a function of giving B a specific right for X based on a badge owned by A to the seal is proposed. For example, when creating a seal, A and B may add a function to the seal that allows B to sell X based on A's music source sales badge. In this case, A may sell X through a market of the community platform based on his/her music source sales badge, and B may sell X through the market of the community platform based on a seal attached to X. In this regard, there is a difference. Since A's sales right is based on his/her own music source sales badge, A has sales right for general music sources. However, B's sales rights are based on the additional function of the seal attached to X, so B has limited sales rights to X only.

In one embodiment, since B's X sales right is based on A's music source sales badge, it is subordinate to the music source sales badge owned by A. For example, if A's music source sales badge is retrieved or expires after B is granted X sales right through a seal, B's X sales right is also subordinated to it and becomes invalid. Referring back to FIG. 17, no seal is displayed on the shown seal management screen 90. This means that there are currently no seals created. To create a new seal, the user may select a seal creation button 91.

Figure 18:
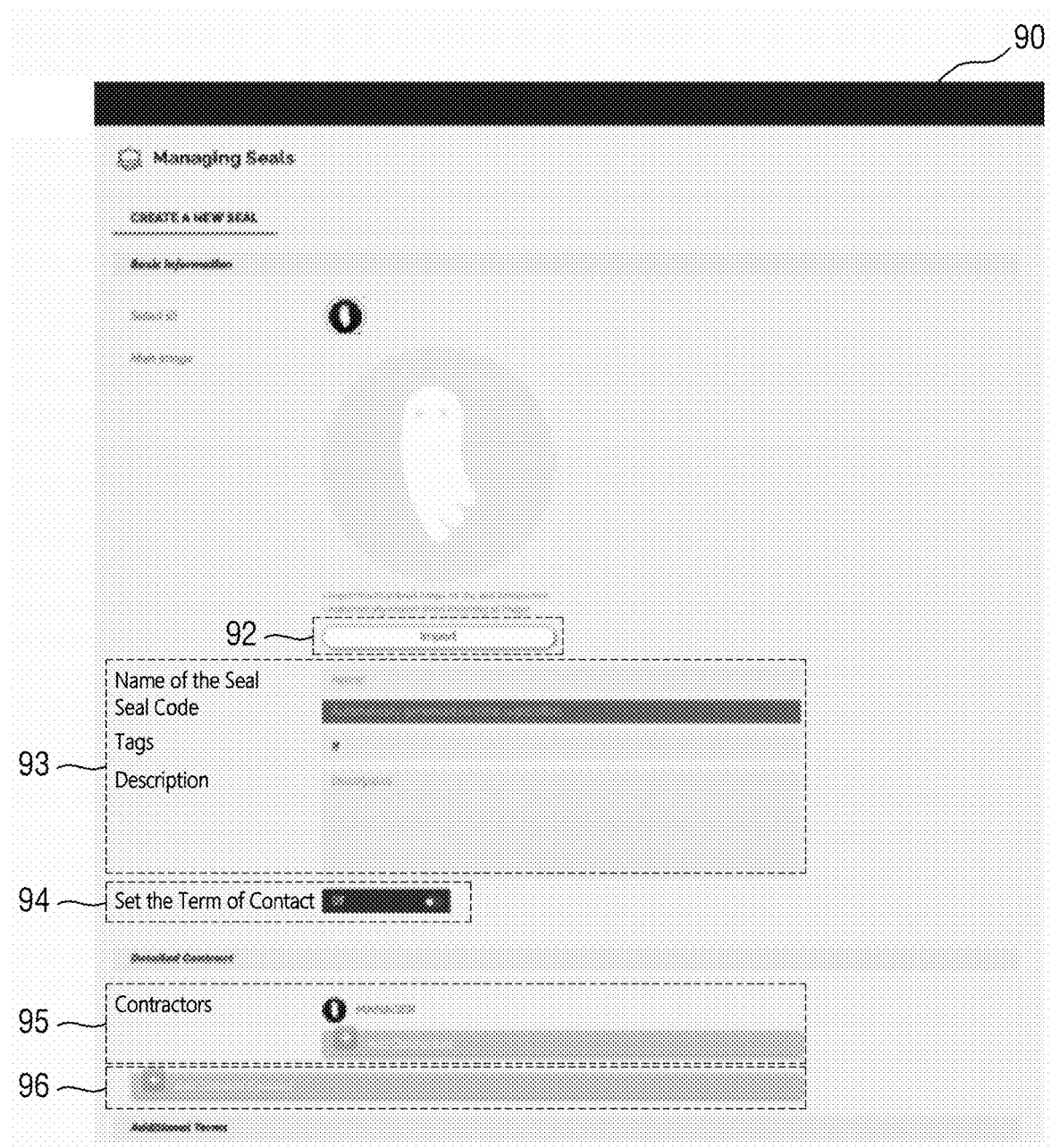

FIG. 18 shows the seal management screen 90 when the user selects the seal creation button 91. At this time, the seal management screen 90 includes a design setting button 92, a seal information setting area 93, a contract period setting area 94, a contractor setting area 95, and a detailed contract condition setting area 96.

The design setting button 92 is a button for setting a design of a seal. When a specific image is selected or uploaded after pressing the design setting button 92, a representative image or logo of a seal is set as the image.

The seal information setting area 93 is an area for inputting various types of information on a seal. For example, the user may input and display a seal name, a seal tag, or a detailed description of a badge through the seal information setting area 93. As an embodiment, a unique code of a seal may be displayed together in the seal information setting area 93. Here, the unique code of the seal may be automatically awarded by the group-based community system when creating the seal.

The contract period setting area 94 is an area for setting a contract period of a seal. Here, the contract period refers to an expiration date during which the rights relationship between members of content may remain in effect. The user may set a contract period for a seal, and in this case, the contract content or rights relationship specified in the seal is valid only within the set contract period.

As an embodiment, the contract period of the seal may be set in various ways. One may set the contract period of the seal in a variety of ways, for example, by entering a starting point and a total duration of the contract period, or entering a start point and an end point of the contract period, respectively.

As an embodiment, the contract period of the seal may be set indefinitely (or there is no time limit). In this case, unless the contract period of the seal is adjusted separately, the seal is always valid and will not expire as the period elapses.

Figure 19:
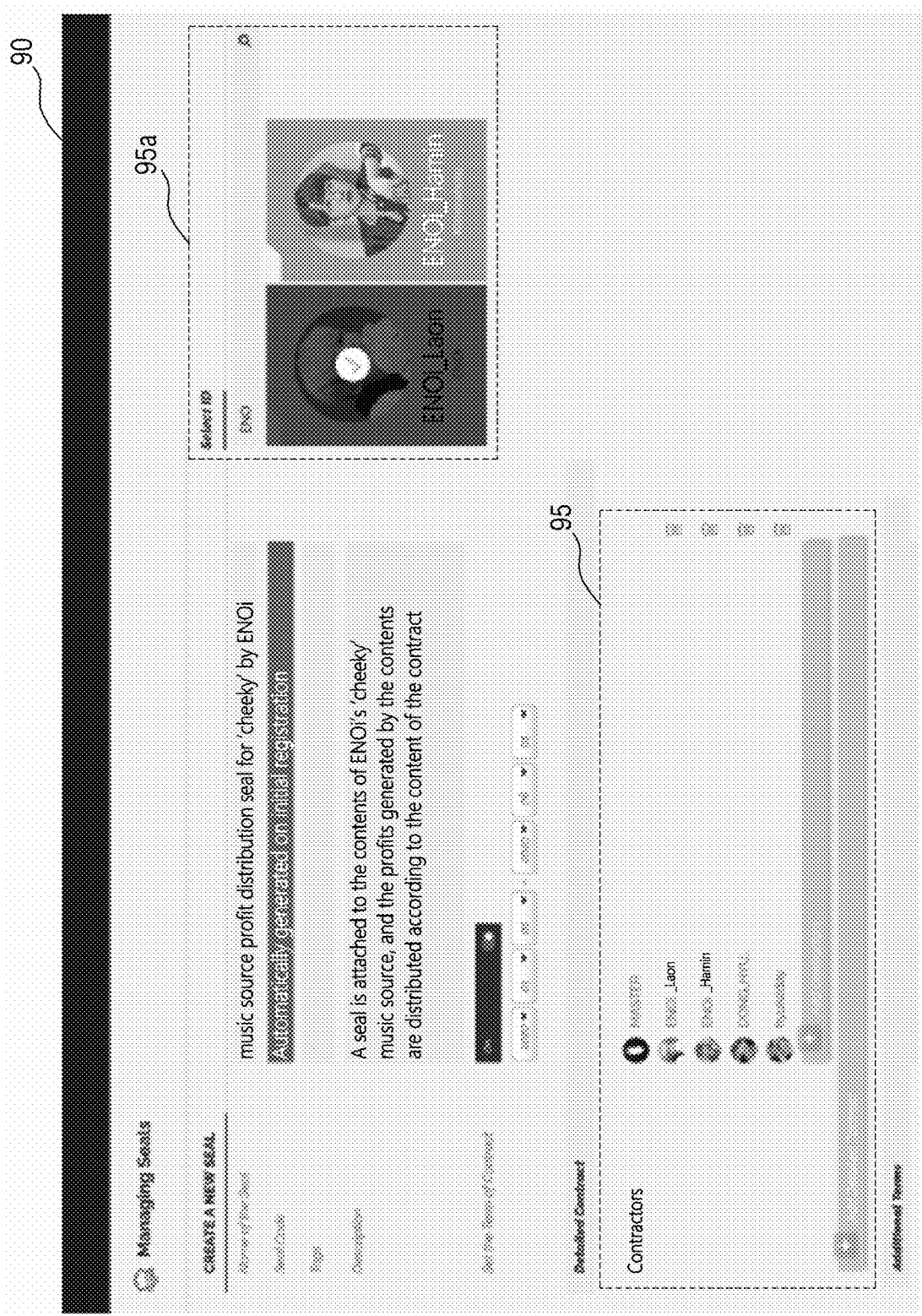

The contractor setting area 95 is an area for setting a contracting party of a seal. This will be described with reference to FIG. 19. FIG. 19 shows the seal management screen 90 when the contractor setting area 95 is selected.

The seal management screen 90 of FIG. 19 may include a list of contracting parties 95 representing currently set contracting parties, and a search area 95a for searching and selecting a member to be added as a new contracting party.

A member selected in the search area 95a is added to the contracting party list 95 as a new contracting party. On the other hand, a member deleted from the contracting party list 95 is excluded from the contracting party.

Figure 20:
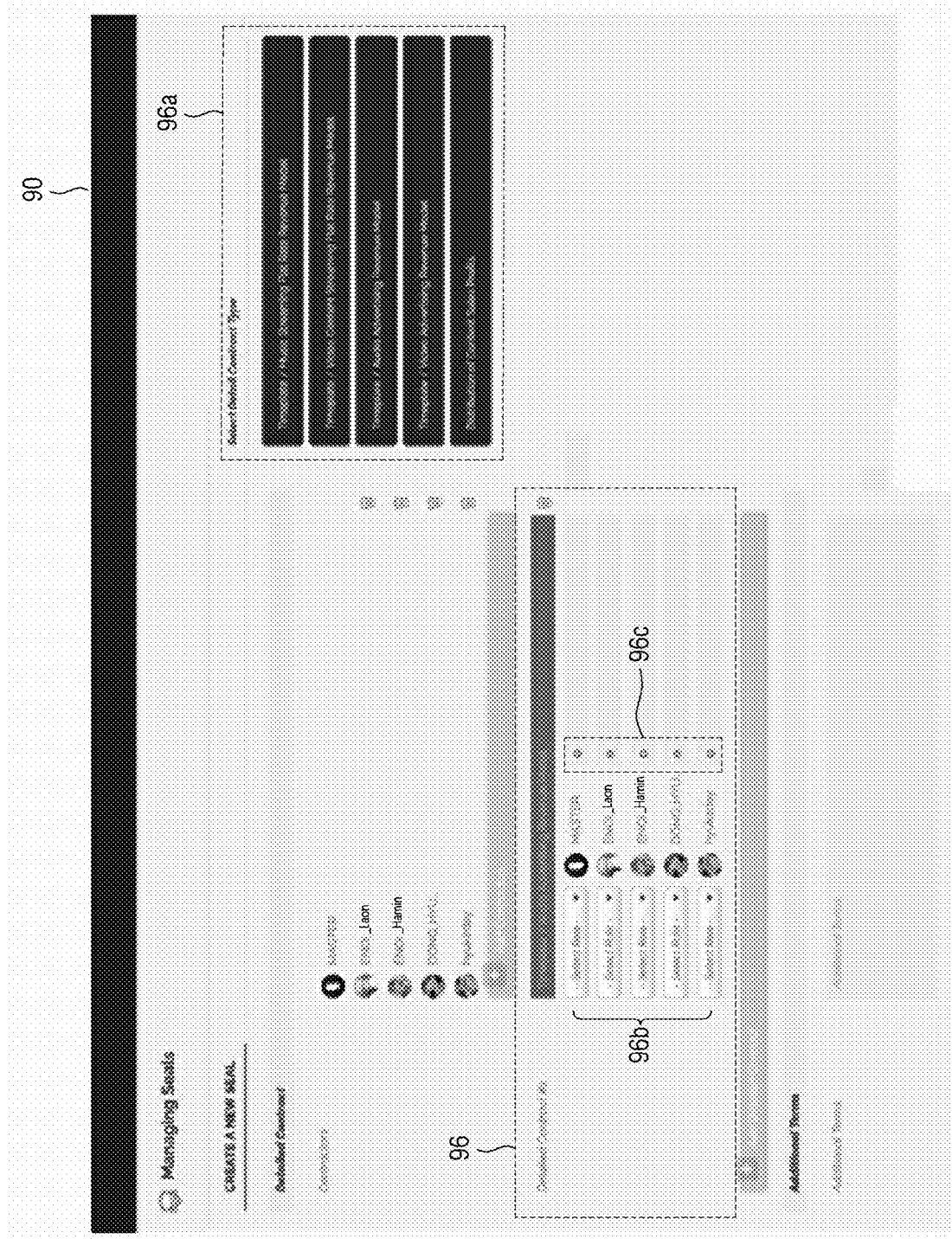

The detailed contract condition setting area 96 is an area for setting more detailed contract clauses. This will be described with reference to FIG. 20. FIG. 20 shows the seal management screen 90 when the detailed contract condition setting area 96 is selected.

The seal management screen 90 of FIG. 20 includes a contract clause list 96a displaying detailed contract clauses that may be set. When a detailed contract clause to be added as the content of the contract is selected from the contract clause list 96a, the selected detailed contract clause is displayed in the detailed contract setting area 96.

In this case, a list 96b of contracting parties to which the selected detailed contract clause is applied may be displayed together in the detailed contract setting area 96. In addition, in this case, an individual application ratio 96c to which the detailed contract clause selected for each contracting party is applied may be displayed together.

Figure 21:
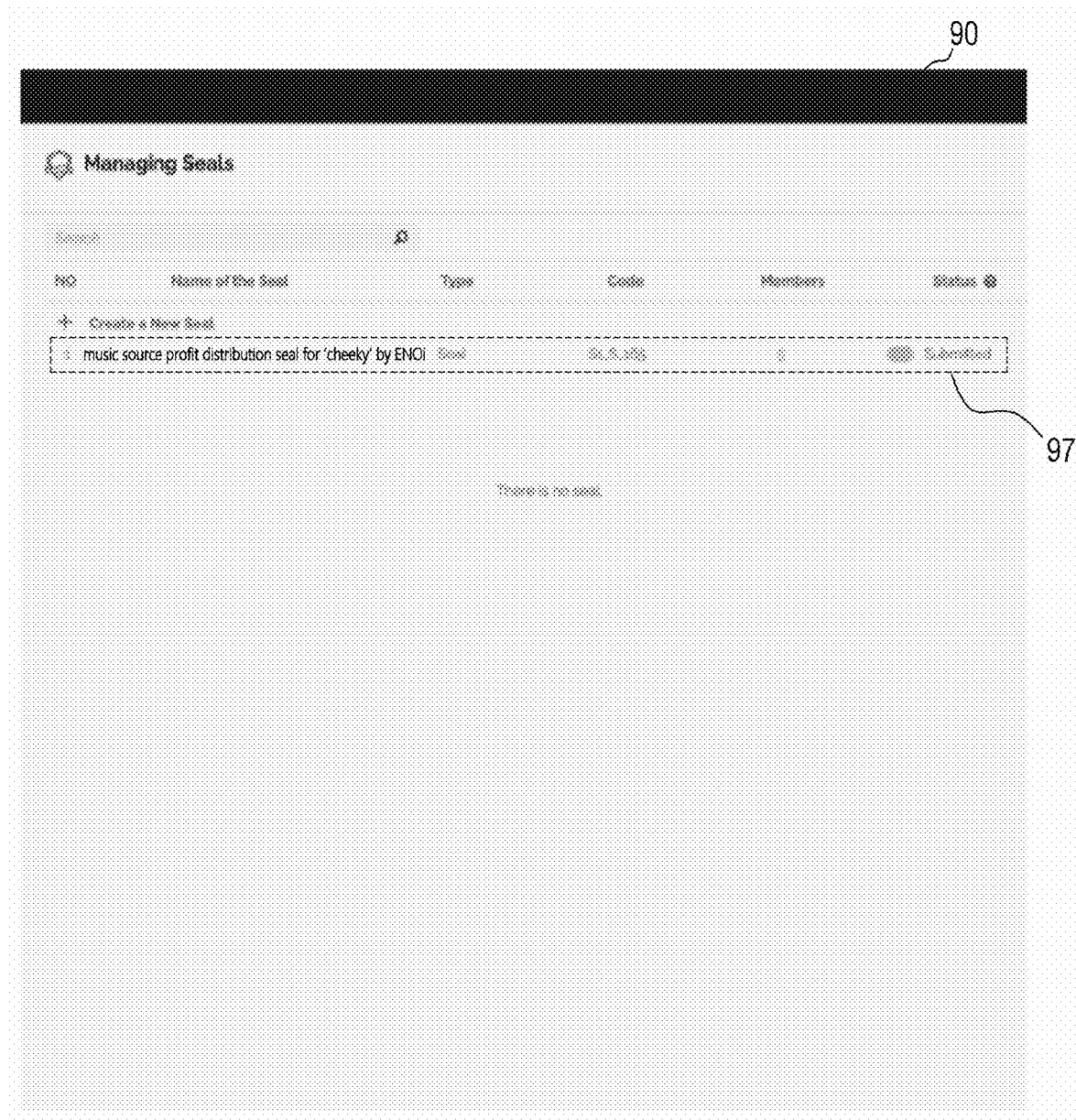

When a new seal is created through the steps described above, the created seal is displayed on the seal management screen 90. Referring to FIG. 21, it may be seen that a list 97 of created seals is displayed on the seal management screen 90.

Figure 22:
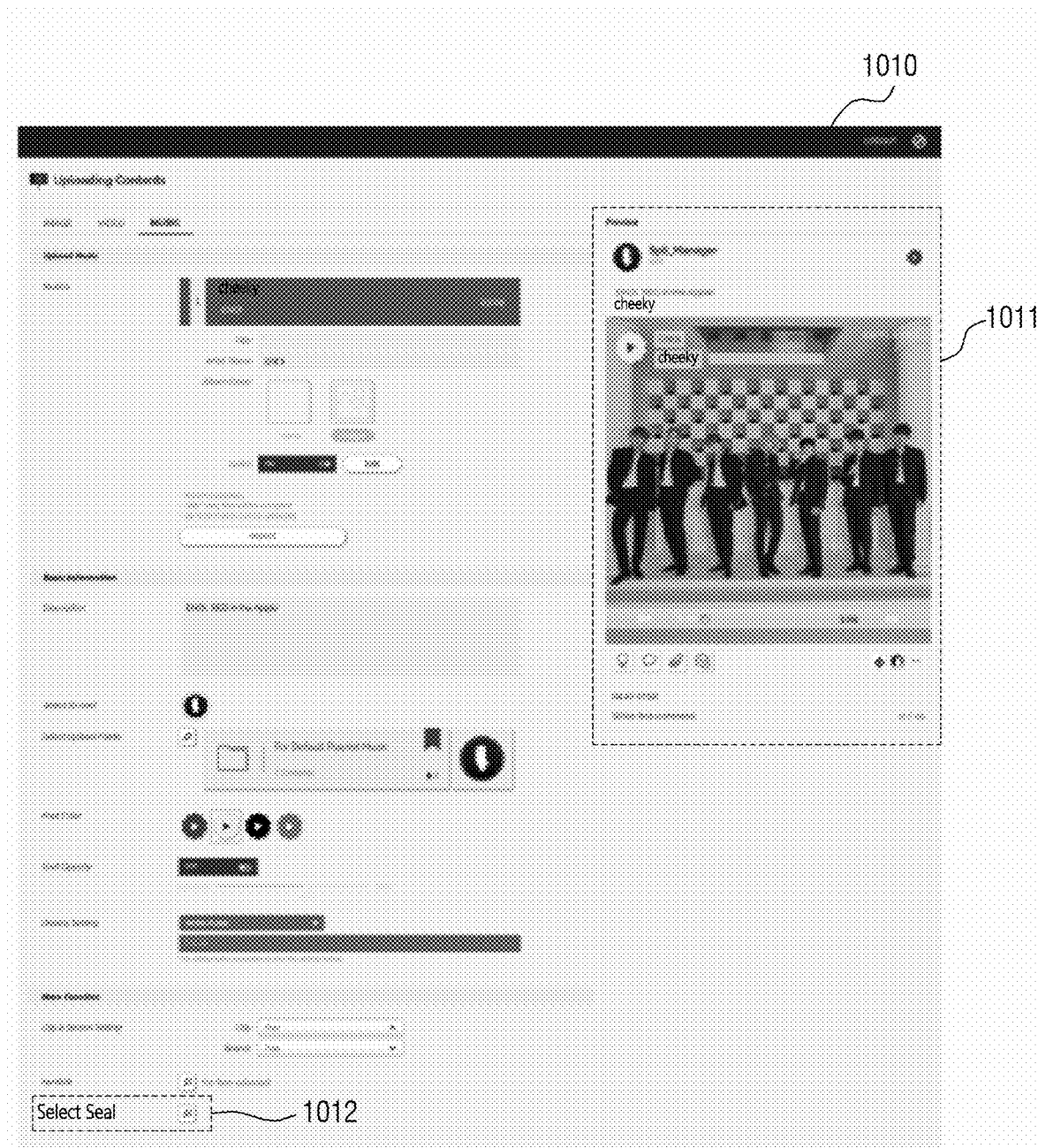

FIG. 22 is a diagram conceptually explaining a method for attaching the created seal to content. FIG. 22 shows a screen 1010 for uploading content. In this embodiment, the content may be uploaded to the community platform described above, or may be uploaded to other platforms such as YouTube, Melon, or Naver.

The user selects a seal setting area 1012 on the content upload screen 1010 to attach a seal to content to be uploaded. When the seal setting area 1012 is pressed, a list of seals attachable to the content to be uploaded may be displayed. The user checks if there is a seal to be attached among them, and if there is, selects the seal.

Figure 23:
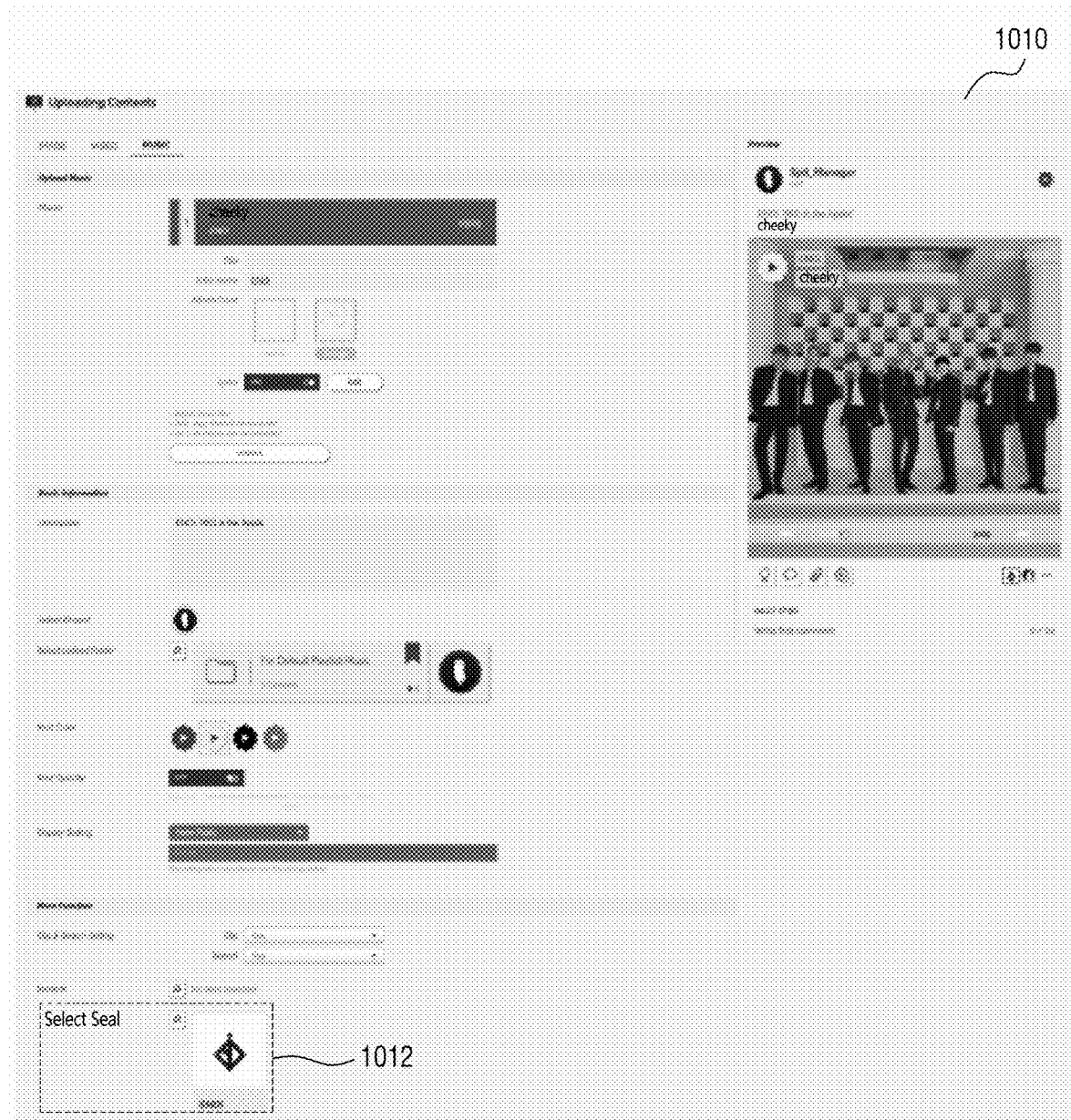

The content upload screen 1010 when the user selects a seal to be attached is shown in FIG. 23. Referring to FIG. 23, it may be seen that the selected seal is displayed in the seal setting area 1012 of the content upload screen 1010. Thereafter, when the user uploads the content, the content is uploaded with the selected seal attached.

Figure 24:
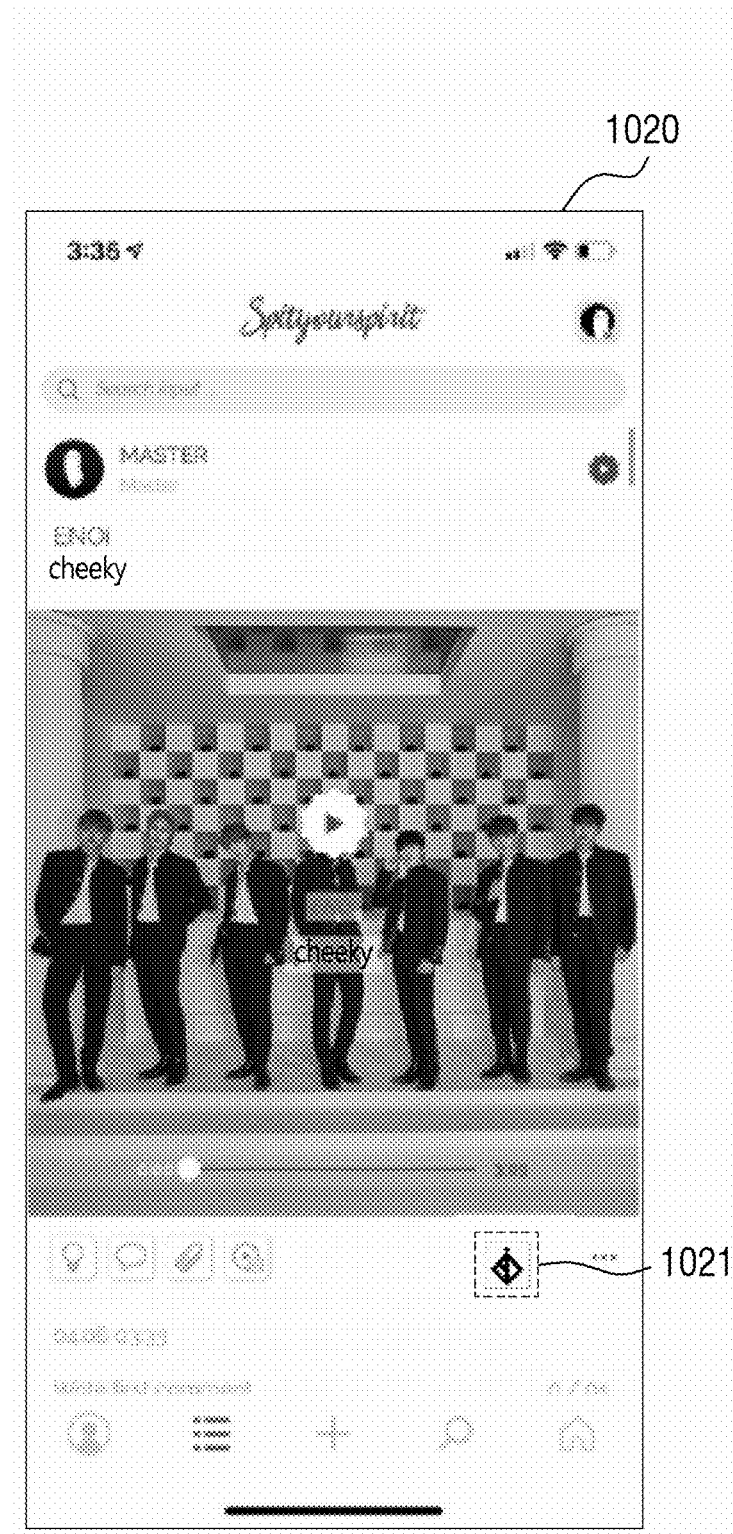

When the uploaded content is played through the platform, the seal attached to the content may be displayed together. FIG. 24 exemplarily shows a screen 1020 of the user terminals 200, 300, and 400 that play the uploaded content. It may be seen that a seal 1021 attached to the corresponding content is also displayed at the bottom of a content playback screen.

Figure 25:
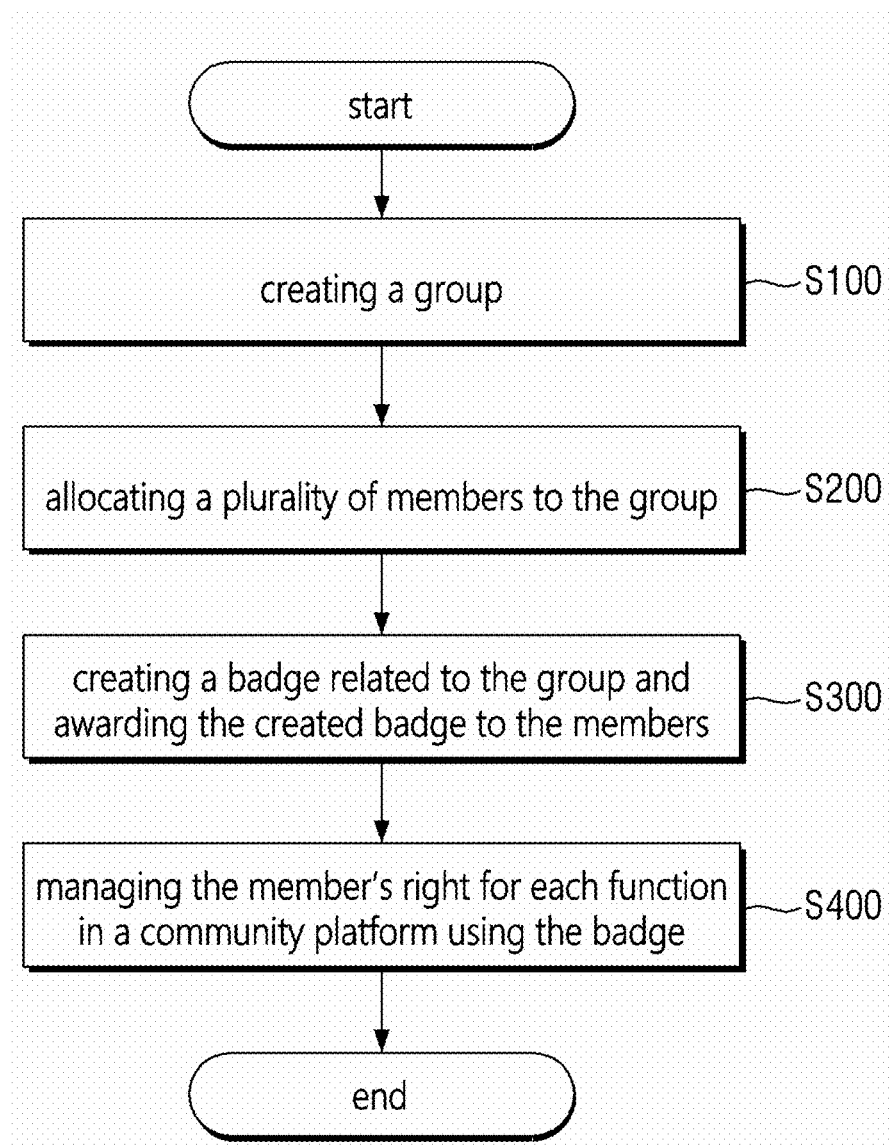
FIG. 25 is a flowchart illustrating a method for managing a group-based community system according to an embodiment of the disclosure.

FIG. 25 is a flowchart illustrating a method for managing a group-based community system according to an embodiment of the disclosure. The method described in FIG. 25 is a method performed by the group-based community system described above, and may be performed by the server 100 of FIG. 1 or the user terminals 200, 300, and 400.

In step S100, a group-based community system creates a group for providing a group-based community service.

In step S200, the group-based community system allocates a plurality of members to the created group.

Steps S100 and S200 are performed using the group management module 110 of FIG. 2, and are performed in the same manner as the series of methods described in FIGS. 3 to 7 above. Therefore, a detailed description of the methods will be omitted to avoid duplication of description.

In step S300, the group-based community system creates a badge related to the group, and awards the created badge to at least some of the plurality of members.

Step S300 is performed using the badge management module 130 of FIG. 2, and is performed in the same manner as the series of methods described in FIGS. 9 to 14. Therefore, a detailed description of the methods will be omitted to avoid duplication of description.

In step S400, the group-based community system manages the member's right for each function in the community platform using the badge.

Specifically, when each member tries to use a specific function (hereinafter referred to as a first function) within the community platform, the group-based community system checks whether the member owns a badge in which the first function is set. If the badge for which the first function is set is owned, it is determined that the member has the right to use the first function, and the result is returned by executing the first function.

On the other hand, if the badge for which the first function is set is not owned, it is determined that the member does not have the right to use the first function. Accordingly, after stopping the execution of the first function, a message indicating that the member does not have the right to use the first function is displayed.

According to the group-based community system and the method for managing the same described with reference to FIGS. 1 to 25 so far, badges with execution rights for each function in a community platform are created, and each member's access rights to the corresponding function are managed through the badge. Through this, it is possible to effectively manage and support roles and activities of each member within the community platform.

In addition, it is possible to evaluate each member's activities in the community platform and display them externally through additional functions such as achievement awarding. Through this, it is possible to motivate each member to become more active within the community platform.

In addition, by transparently and clearly managing the rights relationship between members of content through a seal, it is possible to prevent contention between members that may arise over rights to the content in advance, and it will be possible to transparently and effectively distribute profits generated through the content according to a contribution rate (or distribution rate) specified in the seal.

Hereinafter, an exemplary computing device 500 that can implement an apparatus and a system, according to various embodiments of the present disclosure will be described with reference to FIG. 26. For example, server 100 or user terminal 200, 300, 400 of FIG. 1 may be implemented using computing device 500 of FIG. 26.

Figure 26:
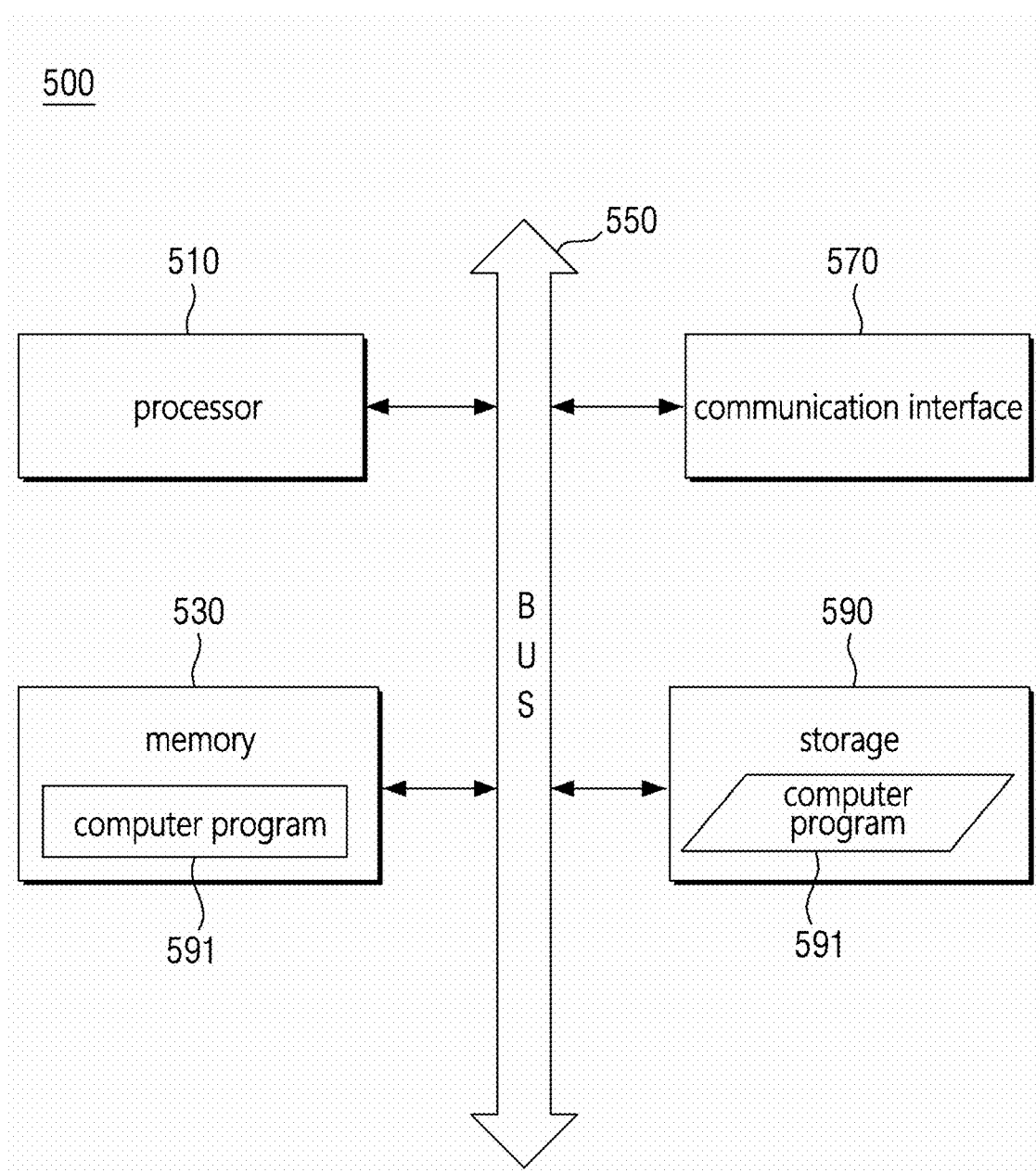
FIG. 26 is a block diagram illustrating an exemplary hardware configuration of a computing device 500 in which various embodiments of the disclosure are implemented.

FIG. 26 is an example hardware diagram illustrating a computing device 500.

As shown in FIG. 26, the computing device 500 may include one or more processors 510, a bus 550, a communication interface 570, a memory 530, which loads a computer program 591 executed by the processors 510, and a storage 590 for storing the computer program 591. However, FIG. 26 illustrates only the components related to the embodiment of the present disclosure. Therefore, it will be appreciated by those skilled in the art that the present disclosure may further include other general purpose components in addition to the components shown in FIG. 26.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. For example, the computer program 591 may include instructions for processing operations of creating a group, allocating a plurality of members to the group, creating a badge related to the group and awarding the badge to a first member of the plurality of members, and managing, by using the badge, a right of the first member for a predetermined function in a community platform in which at least some members of the plurality of members participate. When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the disclosure. Therefore, the disclosed preferred embodiments of the invention are used in a generic and descriptive sense only and not for purposes of limitation. The scope of protection of the disclosure should be interpreted by the following claims, and all technical ideas within the scope equivalent thereto should be construed as being included in the scope of the technical idea defined by the present disclosure.

What is claimed is:

1. A group-based community system, comprising:
   a group management module for creating a group and assigning a plurality of members to the group; and
   a badge management module for creating a badge related to the group and awarding the badge to a first member of the plurality of members,
   wherein, by using the badge, a right of the first member for a predetermined function in a community platform in which at least some members of the plurality of members participate is managed,
   wherein, the community platform is an address book platform providing contracts and profiles of each member of the groups and the profile of a member displays the badge awarded to the first member, as an icon, and
   wherein, the predetermined function comprises a content usage function, a content upload function, a content sales function, a product sales function, or a function to receive a distribution of content-based profits in the address book platform.

2. The system of claim 1, wherein the first member is provided with a first incentive for an activity of the first member within the community platform,
wherein the first incentive comprises a second incentive based on whether the first member owns the badge.

3. The system of claim 1, wherein the badge is a music source purchase authentication badge awarded to the first member when the first member purchases a music source, and
wherein the predetermined function comprises a function to add the music source to a playlist of the first member, a function to arrange or post the playlist to which the music source has been added to a personal social network service (SNS) space of the first member, or a function that allows the first member to receive a distribution of profits according to a predetermined ratio when the music source generates the profits through a streaming service.

4. The system of claim 1, wherein the badge is a music source purchase authentication badge awarded to the first member when the first member purchases a music source, and
wherein, when there is a hidden track or hidden video related to the music source, the predetermined function comprises a function to add the hidden track or the hidden video to a playlist of the first member, a function to arrange or post the playlist to which the hidden track or the hidden video is added to a personal social network service (SNS) space of the first member, or a function to play all the running sections of the hidden track or the hidden video.

5. The system of claim 1, wherein the group management module sets the type of profile information to be displayed on an ID card of the member belonging to the group.

6. The system of claim 1, wherein the group management module:
displays a list of the members belonging to the group; and
adds new members to the group or excludes some of the members of the group from the group.

7. The system of claim 6, wherein when adding the new member to the group, the group management module determines whether to add the new member to the group based on votes of the members belonging to the group.

8. The system of claim 1, wherein the badge management module:
displays a list of the members who have been awarded the badge; and
newly awards the badge to a second member of the plurality of members, or retrieves the badge from the first member.

9. The system of claim 1, wherein the badge management module sets an expiration date of the badge.

10. The system of claim 1, further comprising:
a community management module for creating the community platform and managing members of the community platform and a platform environment.

11. The system of claim 10, wherein the community management module creates an achievement item for representing an activity within the community platform, and selectively awards the created achievement item to a member of the community platform.

12. The system of claim 1, further comprising:
a contract management module for managing a right relationship between the plurality of members for content.

13. The system of claim 12, wherein the right relationship comprises an ownership relationship with the content, a distribution right relationship with respect to profits obtained based on the content, or a contribution relationship that contributes to the production of the content.

14. The system of claim 12, wherein the contract management module:
creates a seal indicating the right relationship between the plurality of members; and
registers the seal with the content when the content is uploaded.

15. The system of claim 14, wherein the seal comprises information indicating an expiration date of the right relationship.

16. The system of claim 14, wherein the seal comprises a function to grant a predetermined right for the content to at least one member of the plurality of members.

17. The system of claim 16, wherein the predetermined right is a right to sell the content within the community platform.

18. The system of claim 14, wherein the contract management module distributes profits obtained based on the content to the plurality of members using the seal.

19. A method for managing a group-based community system, the method being performed by a computing device, and comprising:
creating a group;
allocating a plurality of members to the group;
creating a badge related to the group and awarding the badge to a first member of the plurality of members; and
managing, by using the badge, a right of the first member for a predetermined function in a community platform in which at least some members of the plurality of members participate,
wherein, the community platform is an address book platform providing contracts and profiles of each member of the groups and the profile of a member displays the badge awarded to the first member, as an icon, and
wherein, the predetermined function comprises a content usage function, a content upload function, a content sales function, a product sales function, or a function to receive a distribution of content-based profits in the address book platform.

* * * * *